(12) United States Patent  
Nonaka et al.

(10) Patent No.: US 8,125,439 B2  
(45) Date of Patent: Feb. 28, 2012

(54) LIQUID CRYSTAL DISPLAY APPARATUS

(75) Inventors: Ryosuke Nonaka, Kawasaki (JP); Masahiro Baba, Yokohama (JP); Goh Itoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 746 days.

(21) Appl. No.: 12/332,097

(22) Filed: Dec. 10, 2008

(65) Prior Publication Data

US 2009/0201245 A1  Aug. 13, 2009

(30) Foreign Application Priority Data

Dec. 10, 2007 (JP) ................. 2007-318837

(51) Int. Cl.  
*G09G 3/36* (2006.01)

(52) U.S. Cl. ................................... 345/102

(58) Field of Classification Search .......... None  
See application file for complete search history.

(56) References Cited

U.S. PATENT DOCUMENTS

2006/0125771 A1  6/2006  Inuzuka et al.  
2006/0214904 A1  9/2006  Kimura et al.

FOREIGN PATENT DOCUMENTS

| JP | 2005-309338 | 11/2005 |
|---|---|---|
| JP | 2006-145798 | 6/2006 |
| JP | 2007-034251 | 2/2007 |

OTHER PUBLICATIONS

Swinkels et al.: "Effect of Backlight Segmentation on Perceived Image Quality for HDR Displays"; IDW '06, pp. 1451-1454, (2006).  
Nonaka et al., "Image Display Apparatus and Image Display Method", U.S. Appl. No. 12/236,338, filed Dec. 2, 2008.

*Primary Examiner* — Paul Huber  
(74) *Attorney, Agent, or Firm* — Finnegan, Henderson, Farabow, Garrett & Dunner, L.L.P.

(57) ABSTRACT

A liquid crystal display apparatus includes: a liquid crystal panel having a plurality of pixels arranged in a matrix form; a back light having a plurality of light sources controlled individually in light emission luminance to supply light to the liquid crystal panel; an image processing unit configured to calculate luminance setting values respectively of the light sources of the back light and correct the video signal; a back light control unit configured to control the back light on the basis of luminance setting values; and a liquid crystal drive unit configured to drive the liquid crystal panel on the basis of the corrected video signal. In strength distribution of light incident, a relative strength compared with a direct component in spatial frequency domain is equal to or less than a first threshold in a spatial frequency region having a value of at least 1.

7 Claims, 23 Drawing Sheets

LIQUID CRYSTAL DISPLAY APPARATUS

CROSS-REFERENCE TO RELATED APPLICATION

This application is based upon and claims the benefit of priority from prior Japanese Patent Application No. 2007-318837 filed on Dec. 10, 2007 in Japan, the entire contents of which are incorporated herein by reference.

BACKGROUND OF THE INVENTION

1. Field of the Invention

The present invention relates to a liquid crystal display apparatus.

2. Related Art

Conventionally, back light luminance control using a plurality of light sources capable of exercising light emission control individually is conducted in liquid crystal display apparatuses with the object of attaining a high contrast and lower power dissipation.

For example, in JP-A 2007-34251 (KOKAI), the back light is formed of a plurality of light sources and light emission luminance is controlled for each light source.

In the conventional liquid crystal display apparatuses, however, spatial distribution of strength of light incident on the liquid crystal panel in response to light emission of respective light sources (hereafter simply referred to as light emission luminance distribution of light sources) is not considered. In some cases, problems that luminance unevenness is perceived on the display image and the contrast improvement effect is weakened occur.

SUMMARY OF THE INVENTION

The present invention has been made in view of these circumstances, and an object thereof is to provide a liquid crystal display apparatus capable of suppressing luminance unevenness and capable of preventing the contrast improving effect from being weakened as far as possible.

A liquid crystal display apparatus according to a first aspect of the present invention includes: a liquid crystal panel having a plurality of pixels arranged in a matrix form; a back light having a plurality of light sources which can be controlled individually in light emission luminance to supply light to the liquid crystal panel; an image processing unit configured to calculate luminance setting values respectively of the light sources of the back light on the basis of a video signal and correct the video signal on the basis of the luminance setting value of each light source; a back light control unit configured to control the back light on the basis of luminance setting values; and a liquid crystal drive unit configured to drive the liquid crystal panel on the basis of the corrected video signal, wherein in strength distribution of light incident on the liquid crystal panel from each of the light sources, a relative strength compared with a direct component in spatial frequency domain is equal to or less than a first threshold in a spatial frequency region having a value of at least 1.

A liquid crystal display apparatus according to a second aspect of the present invention includes: a liquid crystal panel having a plurality of pixels arranged in a matrix form; a back light having a plurality of light sources which can be controlled individually in light emission luminance to supply light to the liquid crystal panel; an image processing unit configured to calculate luminance setting values respectively of the light sources of the back light on the basis of a video signal and correct the video signal on the basis of the luminance setting value of each light source; a back light control unit configured to control the back light on the basis of luminance setting values; and a liquid crystal drive unit configured to drive the liquid crystal panel on the basis of the corrected video signal, wherein in strength distribution of light incident on the liquid crystal panel from each of the light sources, a relative strength compared with a direct component in a spatial frequency domain is equal to or greater than a second threshold in a spatial frequency region having a spatial frequency equal to or less than a first spatial frequency which is greater than 0 and less than 1 in value.

A liquid crystal display apparatus according to a third aspect of the present invention includes: a liquid crystal panel having a plurality of pixels arranged in a matrix form; a back light having a plurality of light sources which can be controlled individually in light emission luminance to supply light to the liquid crystal panel; an image processing unit configured to calculate luminance setting values respectively of the light sources of the back light on the basis of a video signal and correct the video signal on the basis of the luminance setting value of each light source; a back light control unit configured to control the back light on the basis of luminance setting values; and a liquid crystal drive unit configured to drive the liquid crystal panel on the basis of the corrected video signal, wherein in strength distribution of light incident on the liquid crystal panel from each of the light sources, a relative strength compared with a direct component in spatial frequency domain is equal to or less than a first threshold in a spatial frequency region having a value of at least 1, and is equal to or greater than a second threshold in a spatial frequency region having a spatial frequency equal to or less than a first spatial frequency which is greater than 0 and less than 1 in value.

DETAILED DESCRIPTION OF THE INVENTION

Hereafter, embodiments of a liquid crystal display apparatus according to the present invention will be described in detail with reference to the drawings.

First Embodiment

A liquid crystal display apparatus according to a first embodiment of the present invention will now be described with reference to FIGS. 1 to 19(f).

Figure 1:
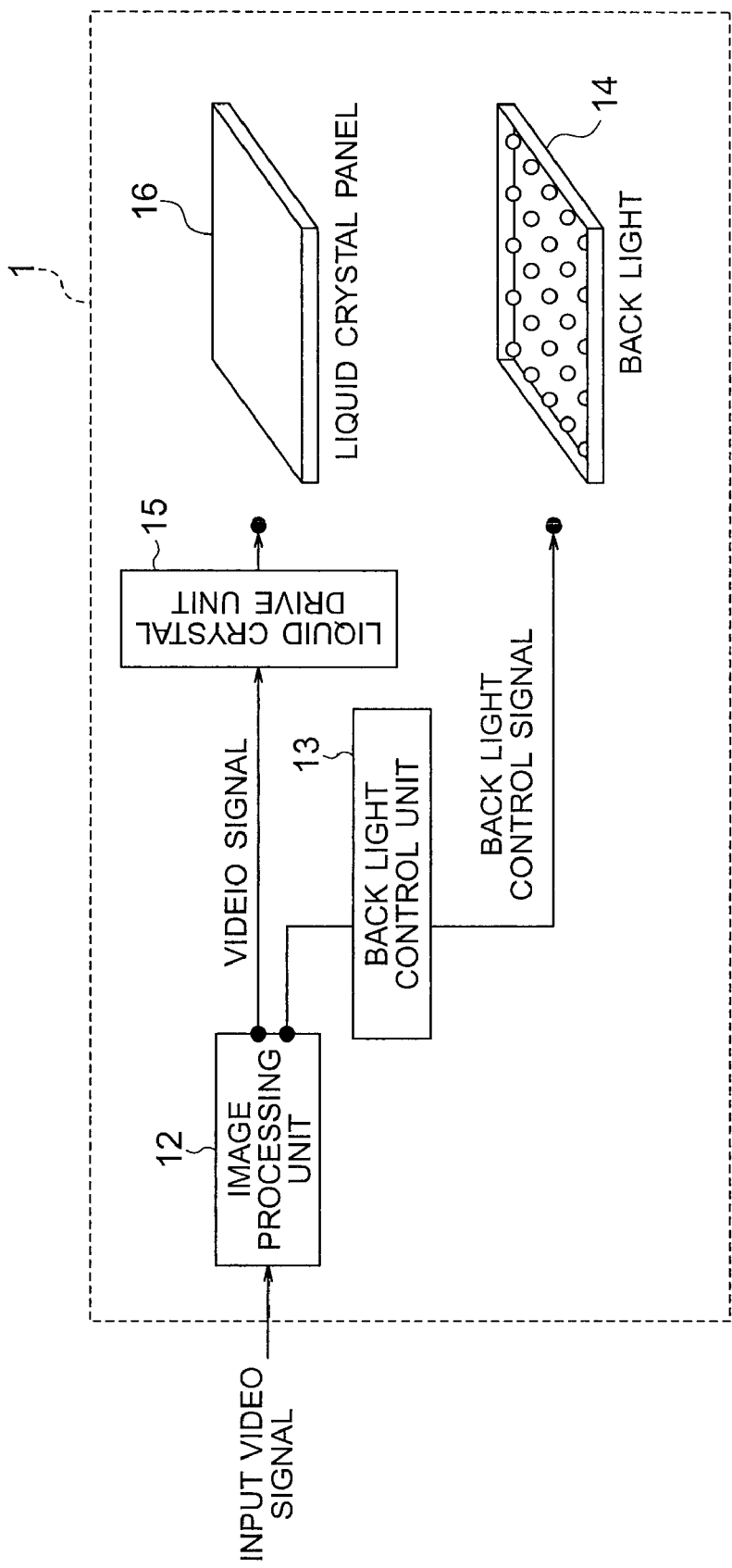
FIG. 1 is a block diagram showing an image display apparatus according to a first embodiment.

The liquid crystal display apparatus according to the present embodiment is shown in FIG. 1. A liquid crystal display apparatus 1 according to the present embodiment includes an image processing unit 12, a back light control unit 13, a back light 14, a liquid crystal drive unit 15, and a liquid crystal panel 16. A video signal is input from the outside to the image processing unit 12. The image processing unit 12 determines luminance of the back light 14 and corrects the video signal on the basis of the input video signal, and outputs resultant signals. The back light control unit 13 outputs a back light control signal to control the back light 14 on the basis of the luminance of the back light 14 determined by the image processing unit 12. The back light 14 is supplied with the back light control signal from the back light control unit 13, and the liquid crystal panel 16 is supplied with the corrected video signal from the image processing unit 12. The back light 14 emits light in accordance with the back light control signal, and applies light to the liquid crystal panel 16 from the back of a display face of the liquid crystal display apparatus 1. The liquid crystal drive unit 15 drives the liquid crystal panel 16 on the basis of the video signal corrected by the image processing unit 12. The liquid crystal panel 16 is driven by the liquid crystal drive unit 15 to change the optical transmittance at each pixel on the liquid crystal panel in accordance with the video signal and consequently change the quantity of light transmitted at each pixel.

Hereafter, details of respective units will be described.

Back Light

Figure 2:
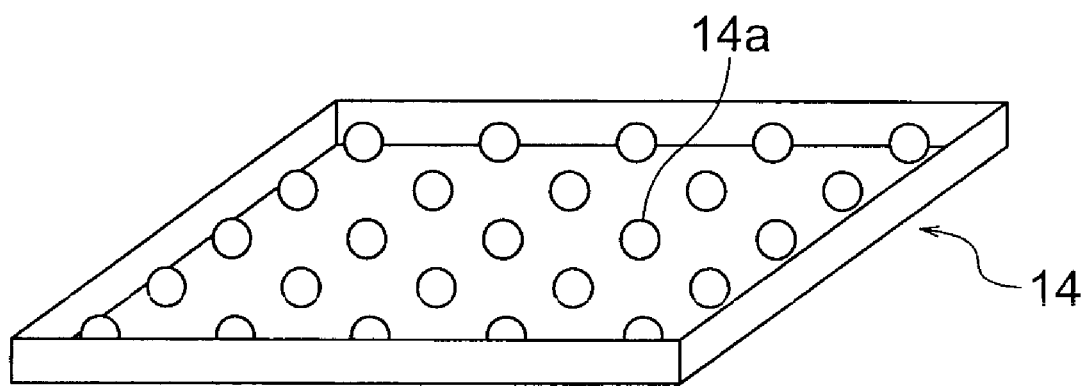
FIG. 2 is a schematic diagram showing a back light according to the first embodiment.
Figure 3:
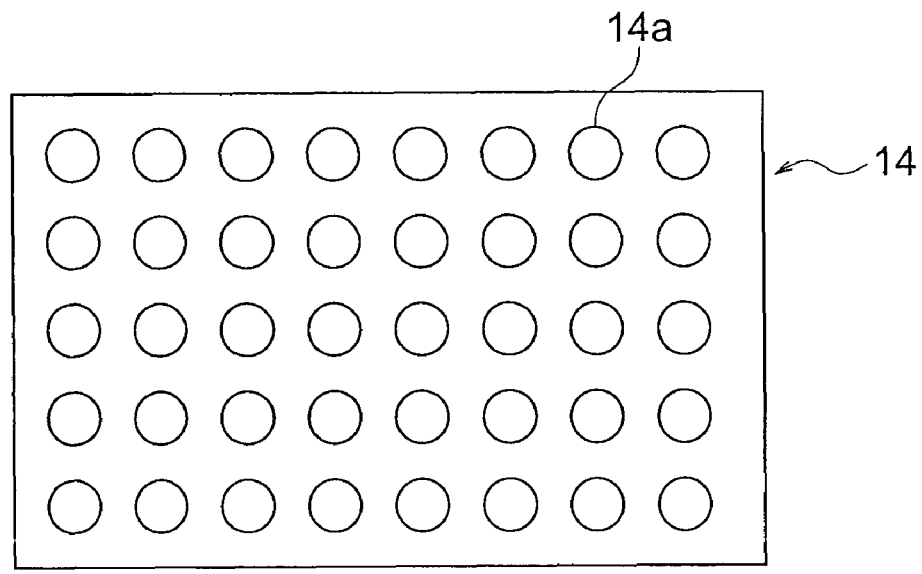
FIG. 3 is a diagram showing a first arrangement example of light sources in the first embodiment.
Figure 4:
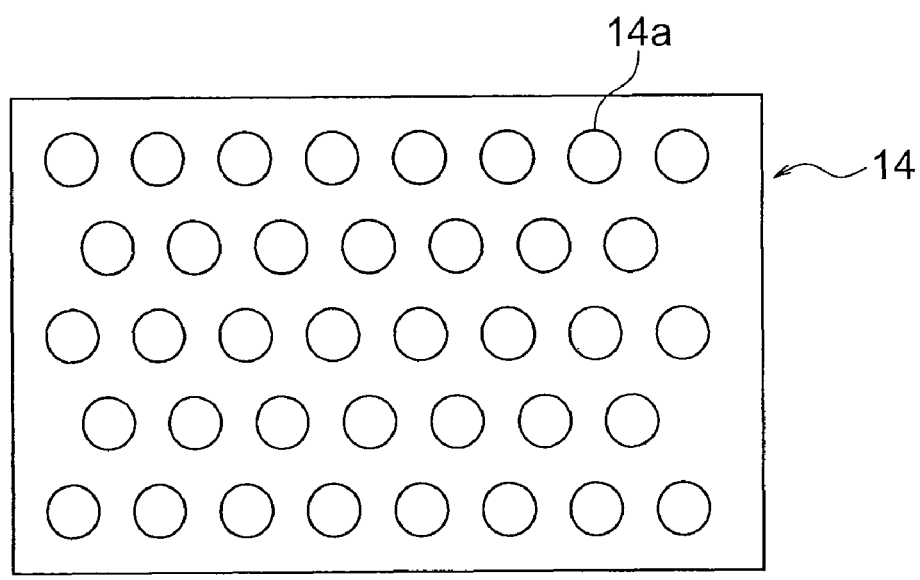
FIG. 4 is a diagram showing a second arrangement example of light sources in the first embodiment.
Figure 5:
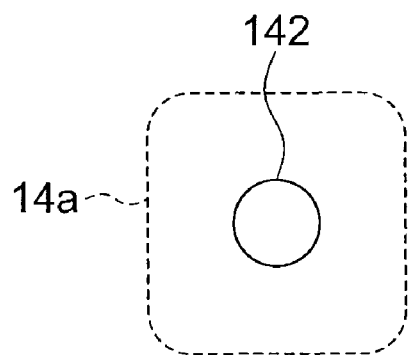
FIG. 5 is a diagram showing a first example of a light source in the first embodiment.
Figure 6:
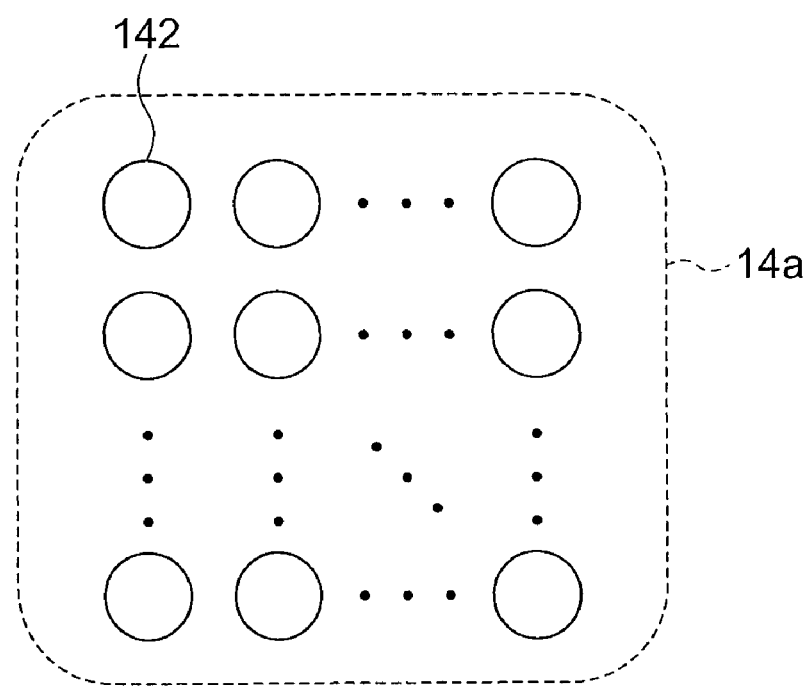
FIG. 6 is a diagram showing a second example of a light source in the first embodiment.

As shown in FIG. 2, the back light 14 includes a plurality of light sources 14a. These light sources 14a are controlled in light emission strength individually to emit light in accordance with the back light control signal input to the back light 14. As shown in FIG. 3, the light sources 14a may be arranged in a matrix form. Or as shown in FIG. 4, it is also possible to arrange light sources 14a in a first row at constant intervals and arrange light sources in a second row adjacent to the first row at the constant intervals so as to be displaced from the light sources 14a in the first row by half of the constant interval. In FIG. 2, each light source is shown to be formed of a single light emitting device. Each light source may be formed of a single light emitting device 142 as shown in FIG. 5. Or each light source may be formed by arranging a plurality of light emitting devices 142 in a matrix form along a plane parallel to the liquid crystal panel 16 as shown in FIG. 6. As for the light emitting device forming the light source, a cold cathode tube, an LED, a hot cathode tube, or the like can be used.

Liquid Crystal Panel and Liquid Crystal Drive Unit

Figure 7:
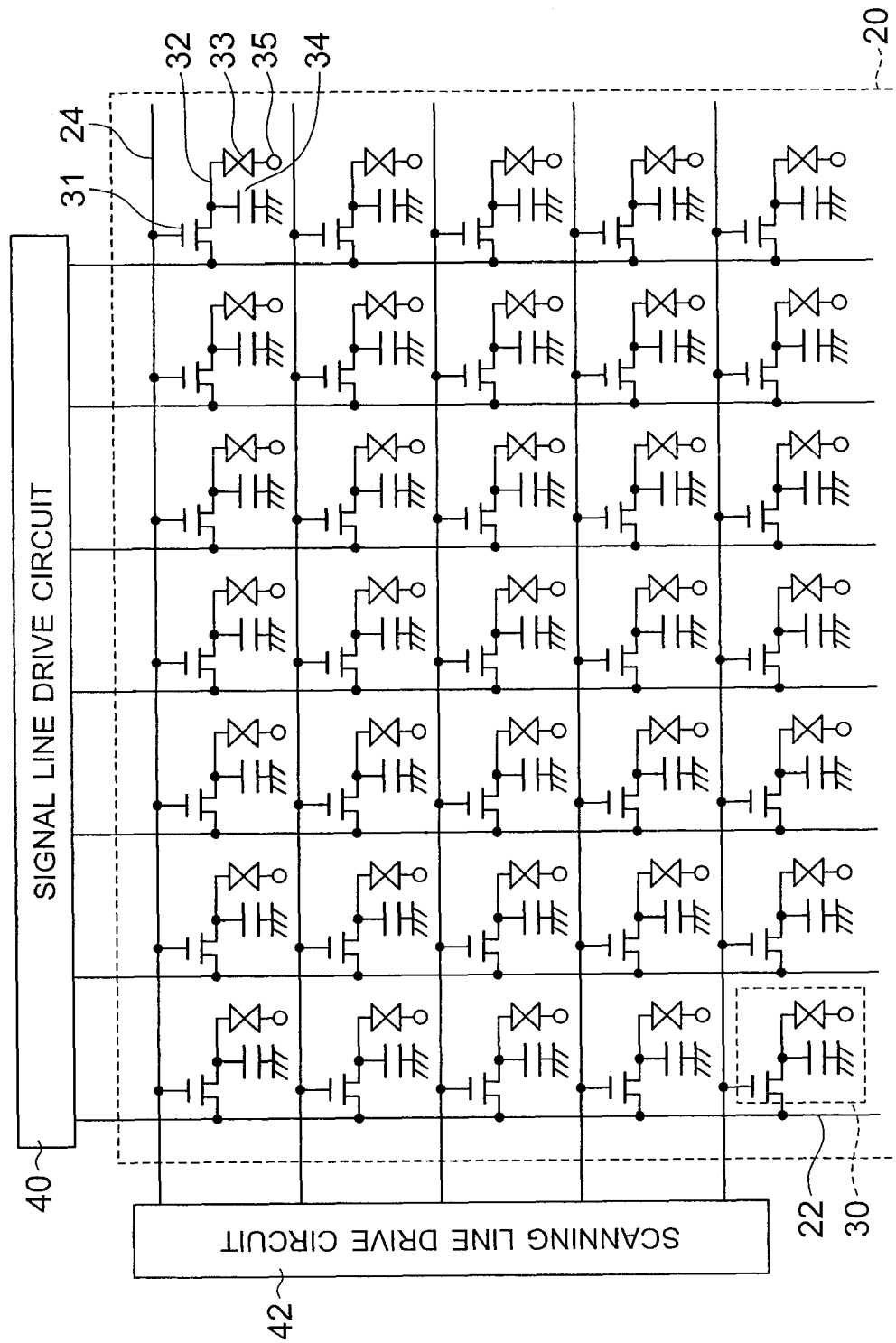
FIG. 7 is a diagram showing a liquid crystal panel and a liquid crystal drive unit in the first embodiment.

The liquid crystal panel 16 is active matrix type in the present embodiment. As shown in FIG. 7, a plurality of signal lines 22 and a plurality of scanning lines 24 which cross the signal lines are arranged in a matrix form on an array substrate 20 via an insulation film which is not illustrated. A pixel 30 is formed in each of crossing parts of the signal lines and the scanning lines. Ends of the signal lines 22 are connected to a signal line drive circuit 40, whereas ends of the scanning lines 24 are connected to a scanning line drive circuit 42.

In the pixel 30, a switch element 31 formed of a thin film transistor (TFT) is a switch element for video signal writing. Gates of the switch elements 31 belonging to one horizontal line are connected in common to a scanning line 24, and sources of the switch elements 31 belonging to one vertical line are connected in common to a signal line 22. In addition, each switch element 31 is connected at its drain to a corresponding pixel electrode 32 and connected to an auxiliary capacitance 34 electrically disposed in parallel to the pixel electrode 32.

The pixel electrode 32 is formed on the array substrate 20. An opposite electrode 35 electrically opposed to the pixel electrode 32 is formed on an opposite substrate which is not illustrated. A predetermined opposite voltage is given to the opposite electrode 35 from an opposite voltage generation circuit which is not illustrated. A liquid crystal layer 33 is held between the pixel electrode 32 and the opposite electrode 35, and surroundings of the array substrate 20 and the opposite substrate are sealed by using a seal material which is not illustrated. By the way, any material may be used for the liquid crystal used for the liquid crystal layer 33. For example, however, ferroelectric liquid crystal or liquid crystal of OCB (Optically Compensated Bend) mode is suitable as the liquid crystal material.

The scanning line drive circuit 42 is formed of shift registers, level shifters and buffer circuits which are not illustrated. The scanning line drive circuit 42 outputs a row selection signal to each scanning line 24 on the basis of a vertical start signal or a vertical clock signal output from a display ratio control unit which is not illustrated as a control signal.

The signal line drive circuit 40 is formed of analog switches, shift registers, sample-hold circuits and video buses which are not illustrated. A horizontal start signal and a horizontal clock signal output from the display ratio control unit as the control signal are input to the signal line drive circuit 40. In addition, a video signal is also input to the signal line drive circuit 40.

Image Processing Unit

The video signal is input from the outside of the liquid crystal display apparatus 1 to the image processing unit 12. The image processing unit 12 determines luminance of the back light 14 and corrects the video signal on the basis of the input video signal, and outputs resultant signals.

Figure 8:
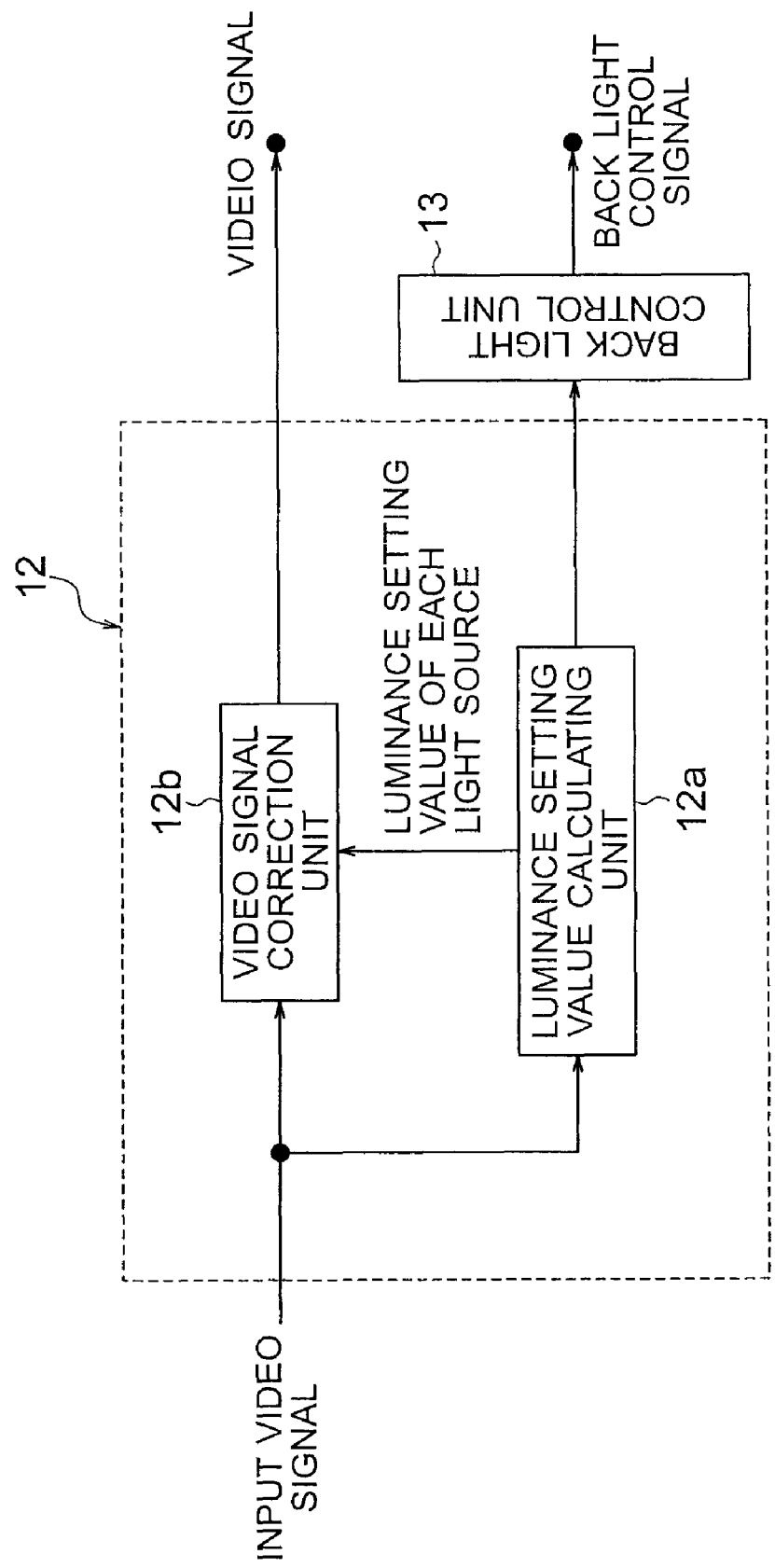
FIG. 8 is a diagram showing an image processing unit in the first embodiment.

FIG. 8 shows a configuration of a concrete example of the image processing unit 12 according to the present embodiment. The image processing unit 12 in this concrete example includes a luminance setting value calculation unit 12a and a video signal correction unit 12b. The video signal input to the image processing unit 12 is input to the luminance setting value calculation unit 12a. The luminance setting value calculation unit 12a calculates a luminance setting value of each light source on the back light 14 on the basis of the input video signal. The video signal input to the image processing unit 12 and the luminance setting value of each light source calculated by the luminance setting value calculation unit 12a are input to the video signal correction unit 12b. The video signal correction unit 12b corrects the video signal on the basis of the luminance setting value of each light source, and outputs a resultant signal.

The luminance setting value of each light source calculated by the luminance setting value calculation unit 12a is converted to the back light control signal by the back light control unit 13, and input to the back light 14. The back light 14 is driven by the back light control unit 13 on the basis of the back light control signal. The video signal corrected by the video signal correction unit 12b is input to the liquid crystal drive unit 15. The liquid crystal drive unit 15 drives the liquid crystal panel 16 on the basis of the corrected video signal.

Hereafter, outline of operation of the luminance setting value calculation unit 12a and the video signal correction unit 12b will be described.

Operation of Luminance Setting Value Calculation Unit

Figure 9:
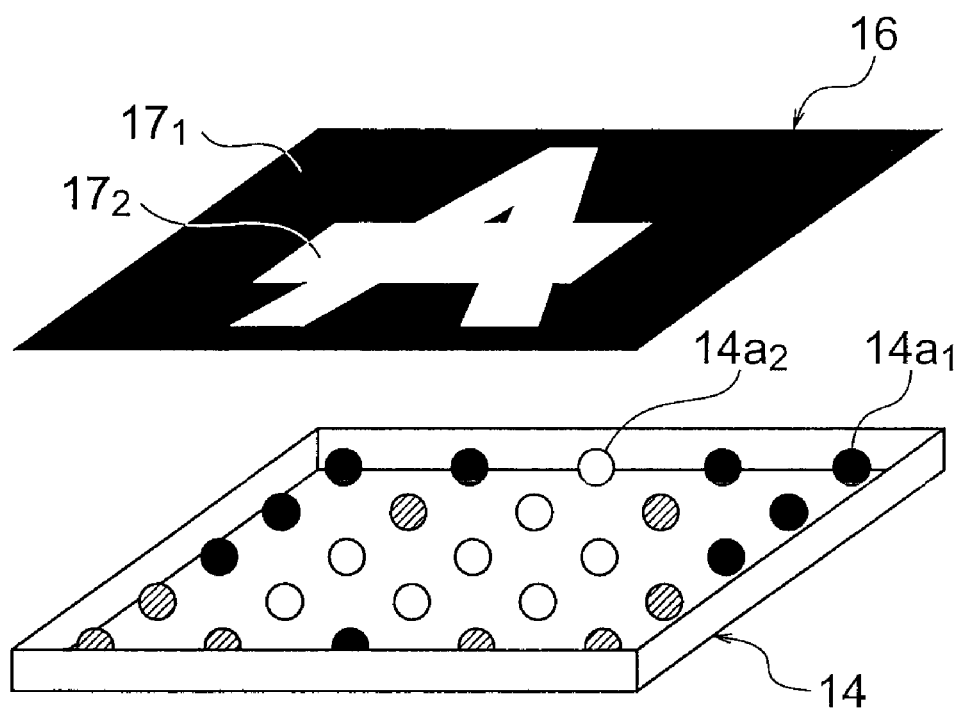
FIG. 9 is a diagram for explaining operation of a back light luminance setting value calculation unit in the first embodiment.
Figure 10:
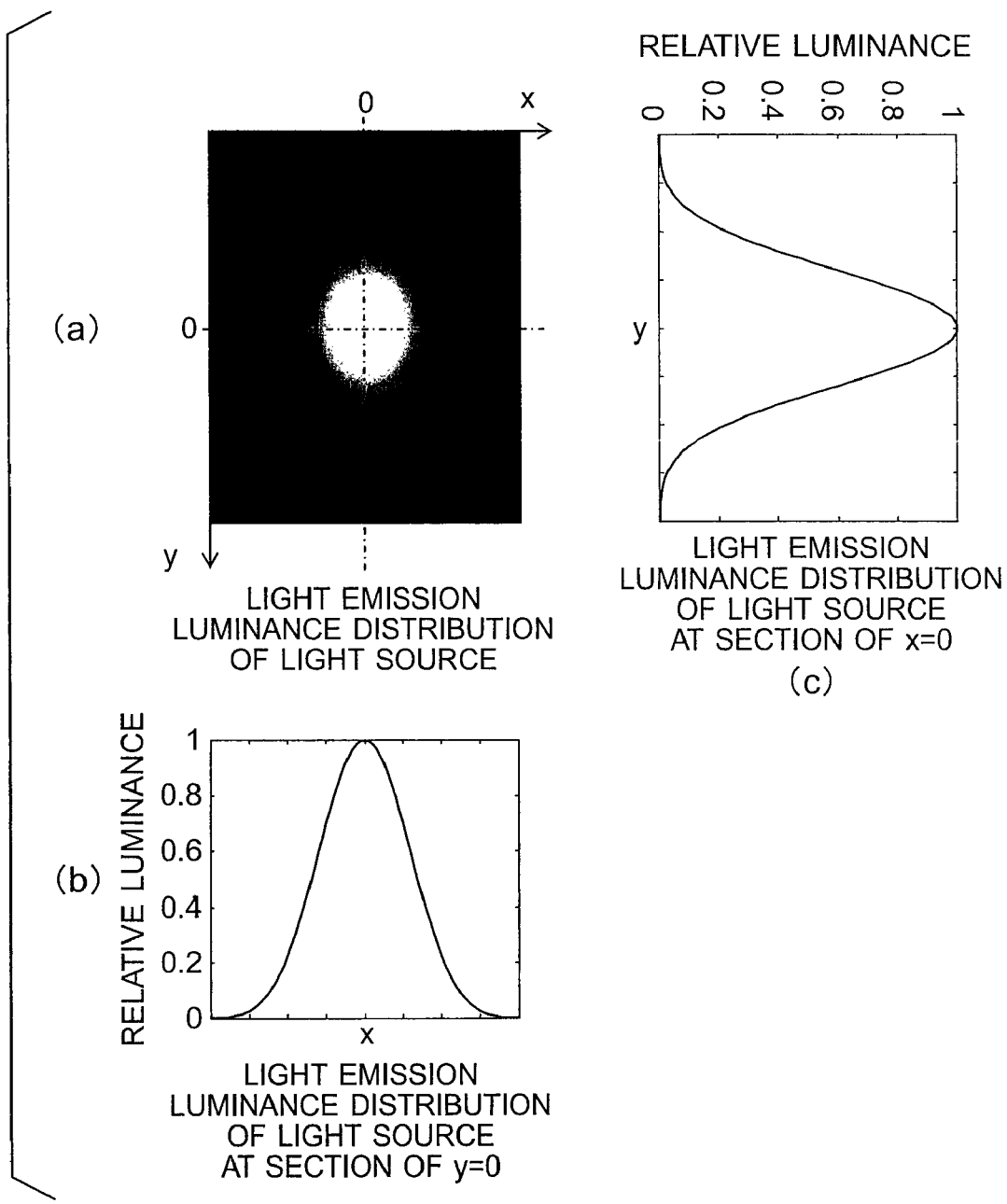
FIGS. 10($a$), 10($b$) and 10($c$) are diagrams for explaining light emission luminance distribution of a light source.

Outline of operation of the luminance setting value calculation unit 12a will now be described with reference to FIG. 9. For example, when displaying a video which expresses a bright object 17₂ on a dark background 17₁ on the liquid crystal panel 16 as shown in FIG. 9, the luminance setting value calculation unit 12a calculates the setting value of luminance of each light source so as to light a light source 14a₁ located right under the dark background 17₁ darkly and light a light source 14a₂ located right under the bright object 17₂ brightly. For example, the luminance setting value calculation unit 12a calculates an average value of luminance at a pixel located right over each light source and pixels located around the pixel from the input video signal, and calculates the luminance setting value of each light source on the basis of the calculated average value of luminance. Or the luminance setting value calculation unit 12a calculates a maximum value of luminance at a pixel located right over each light source and pixels located around the pixel from the input video signal, and calculates the luminance setting value of each light source on the basis of the calculated maximum value of luminance. As for the calculation of the luminance setting value of each light source, it can also be calculated by using other known techniques.

In general, it is very difficult to make the optical transmittance of the liquid crystal panel equal to "0" because of characteristics of the liquid crystal panel. Even if it is attempted to display a pitch-dark part, therefore, luminance of that part cannot be made sufficiently dark if luminance control of every light source cannot be exercised and all light sources can be lit with only the same luminance. Since the optical transmittance of the liquid crystal panel cannot be made "0", light of the back light leaks out from the surface of the liquid crystal panel not a little.

On the other hand, in the case of the liquid crystal display apparatus capable of emitting light with independent luminance every light source as in the present embodiment, it is possible to display a dark part more darkly while maintaining brightness of a bright part by causing the back light 14 to emit light so as to make a light source dark when displaying the dark part and make a light source bright when displaying the bright part. As a result, it is possible to conduct video display with a high contrast and modulation. If light emission with independent luminance every light source is possible, unnecessary lighting in the back light such as lighting a light source brightly although it is attempted to display a dark part can be avoided. As a result, video display with low power dissipation is possible.

Operation of Video Signal Correction Unit in Image Processing Unit

When the back light 14 is subjected to lighting control, it is desirable to correct the video signal input to the liquid crystal panel 16. For example, it is supposed that the video signal input to the liquid crystal display apparatus orders a certain pixel to display with a luminance which is 80% of a maximum display luminance. On the other hand, it is supposed that it is not necessary to set the strength of light of the back light incident on the pixel equal to 100% and the back light is subjected to lighting control so as to set the strength of light of the back light incident on the pixel equal to 90%. If in this case display on the liquid crystal panel is conducted with intact values without correcting the video signal, the display luminance at the pixel where display should be conducted with a luminance of 80% in the original input signal becomes 72% which is 90%×80%. Because the strength of light incident from the back light on the pixel is 90% and the optical transmittance at the pixel is 80%.

If the back light 14 is subjected to lighting control, therefore, then it is desirable to manipulate the video signal input to the liquid crystal panel 16 according to the lighting control. In the above-described example, the video signal should be corrected so as to make the optical transmittance of the liquid crystal panel 16 equal to 88.9%. By doing so, the display luminance becomes 80% which is 90%×88.9%. Display according to the video signal input to the liquid crystal display apparatus can be conducted.

Specifically, for example, the video signal correction unit 12b first calculates relative strength of light incident on each pixel on the liquid crystal panel 16 on the basis of the luminance setting value of each light source calculated by the luminance setting value calculation unit 12a. It is supposed that the relative strength is normalized as strength compared with strength of light incident on each pixel when all light sources on the back light 14 are lit with maximum luminance. Subsequently, the video signal correction unit 12b divides a video signal corresponding to each pixel included in the input video signal (now supposed to be represented by using the unit of relative luminance) by the relative luminance of light incident on each pixel calculated earlier. Finally, the video signal correction unit 12b outputs a value as a result of the division as a newly corrected video signal.

For example, supposing as regards a certain pixel on the liquid crystal panel that the input video signal is 0.8 and the relative strength of light incident on the pixel is 0.9, the video signal correction unit 12b outputs 0.8/0.9=0.889 as a new corrected video signal for the pixel. Transmittance of light for the pixel of the liquid crystal panel becomes 0.889 as a result of the correction. Since light having relative strength of 0.9 is incident on the pixel, relative luminance of light transmitted through the pixel and emitted from the liquid crystal panel surface becomes 0.9×0.889=0.8. Thus, display according to the video signal input to the liquid crystal display apparatus becomes possible.

Light Emission Luminance Distribution of Light Source

If a light source on the back light 14 is caused to emit light, a part of light emitted from the light source is incident on the liquid crystal panel 16. A part of light incident on the liquid crystal panel 16 which depends in quantity upon the optical transmittance of each pixel on the liquid crystal panel 16 passes through each pixel and leaks out from the surface of the liquid crystal panel 16.

Hereafter, strength of light which leaks out from the surface of the liquid crystal panel 16 when the optical transmittance of the liquid crystal panel 16 is maximized, i.e., luminance observed on the surface side of the liquid crystal panel 16 when the optical transmittance of the liquid crystal panel 16 is maximized is handled as light emission luminance of the light source, for convenience' sake. It is justifiable to consider that the light emission luminance of the light source is nearly proportional to the strength of light incident on the liquid crystal panel 16.

Distribution of light emission luminance of a light source observed on the surface side of the liquid crystal panel 16 when the optical transmittances of respective pixels on the liquid crystal panel 16 are made uniform is referred to as light emission luminance distribution of the light source. The distribution (shape) of light emission luminance of the light source and the distribution (shape) of strength of light incident on the liquid crystal panel 16 can be handled as nearly equivalent distribution. It is justifiable to consider that the light emission luminance of the light source is nearly proportional to the strength of light incident on the liquid crystal panel 16.

The light emission luminance distribution of the light source will now be described with reference to FIGS. 10(a), 10(b) and 10(c). FIG. 10(a) is a photograph showing an example of light emission luminance distribution of a single light source obtained when seen from a direction perpendicular to the liquid crystal panel. When a light source having such light emission luminance distribution is caused to emit light and the optical transmittances at respective pixels on the liquid crystal panel 16 are made uniform, the distribution of luminance observed on the surface side of the liquid crystal panel 16 also becomes like the photograph as shown in FIG. 10(a). Because it may be considered that the luminance observed on the surface side of the liquid crystal panel 16 is proportional to the light emission luminance of the light source when the optical transmittances at respective pixels on the liquid crystal panel 16 are uniform. FIGS. 10(b) and 10(c) are diagrams showing light emission luminance distribution of a certain single light source shown in FIG. 10(a) obtained at sections of the vertical location=0 and horizontal location=0. The magnitude of the light emission luminance of the light source is indicated by a relative luminance value normalized by a maximum value (a value at the vertical location=0 or the horizontal location=0 in FIG. 10(b) or 10(c)) of the light emission luminance of the light source.

Light Emission Luminance Distribution of Light Source in the First Embodiment

Figure 11B:
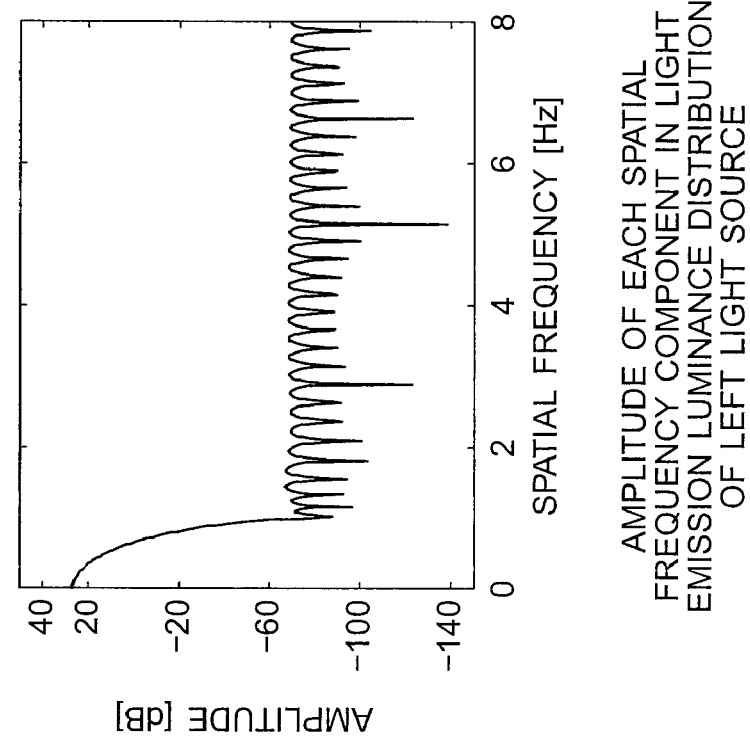
FIGS. 11A and 11B are diagrams showing relations between light emission luminance distribution of a light source and its spatial frequency components.
Figure 11A:
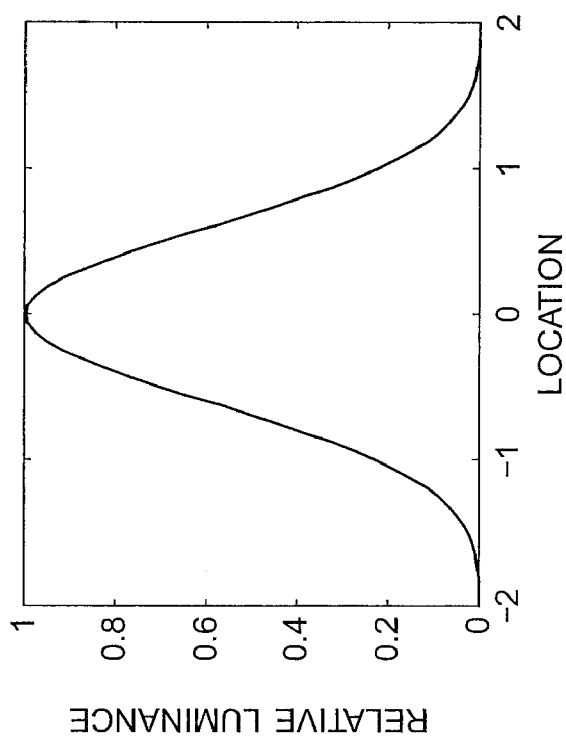

First, relations between the light emission luminance distribution of the light source and its spatial frequency components will now be described with reference to FIGS. 11A and 11B.

In general, an arbitrary function g(x) which represents distribution of some value on the real space can be represented as a sum of a plurality of sine waves having different spatial frequencies. Here, x is a location or a coordinate on the real space. Sine waves forming the function g(x) are referred to as components of g(x). The amplitude (strength) of a component of g(x) at an arbitrary spatial frequency $f_x$ can be found by conducting Fourier transform on g(x). The function g(x) and a function $G(f_x)$ obtained by conducting Fourier transform on g(x) correspond to each other in one-to-one correspondence, and represent the same one distribution. With respect to certain one distribution, g(x) is called function (distribution) in the spatial domain, whereas $G(f_x)$ is called function (distribution) in the spatial frequency domain. For example, amplitudes of respective spatial frequency components contained in light emission luminance distribution of a light source shown in FIG. 11A become as shown in FIG. 11B. Conversely speaking, the light emission luminance distribution of the light source shown in FIG. 11A is formed of sine waves each having a spatial frequency and an amplitude shown in FIG. 11B. A component having a spatial frequency 0 Hz shown in FIG. 11A is a constant component having luminance which does not change spatially and called direct current component.

Figure 12B:
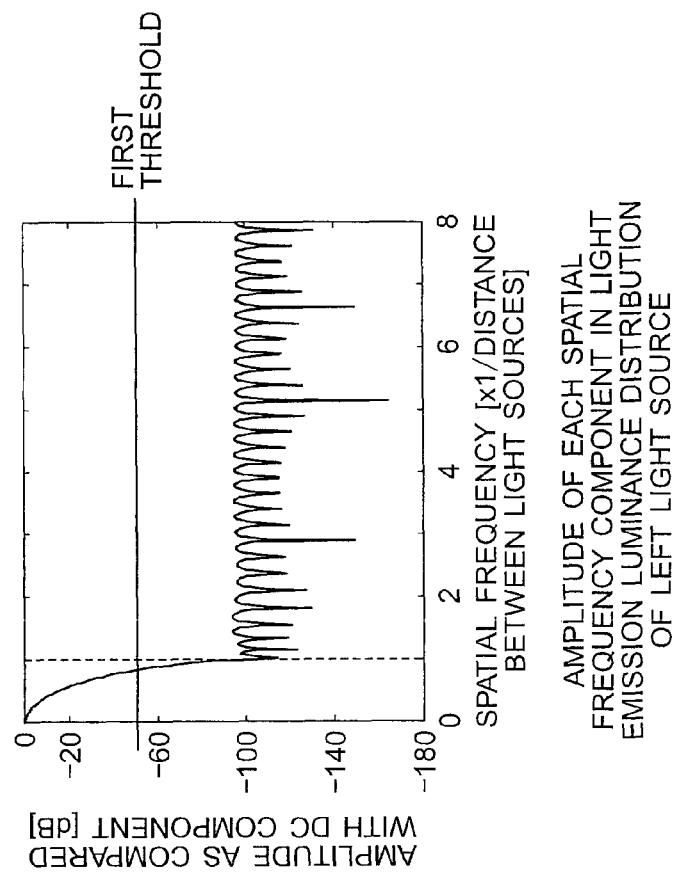
FIGS. 12A and 12B are diagrams showing an example of light emission luminance distribution of a light source in the liquid crystal display apparatus according to the first embodiment.
Figure 12A:
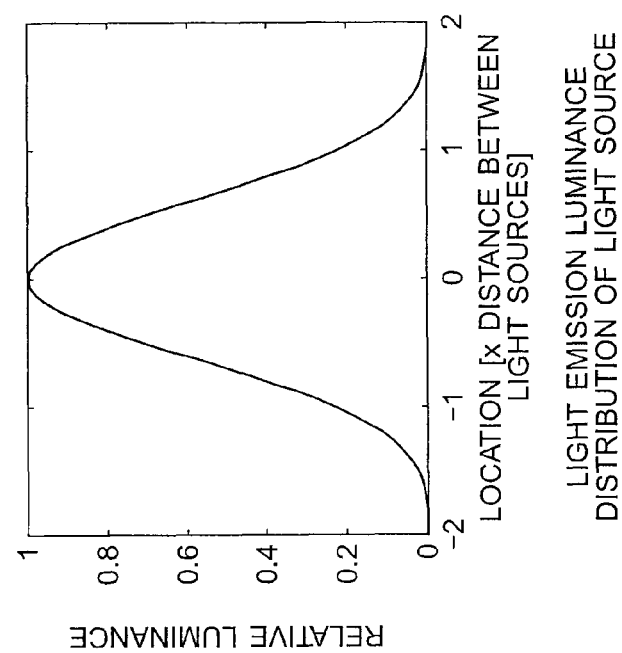
Figure 13:
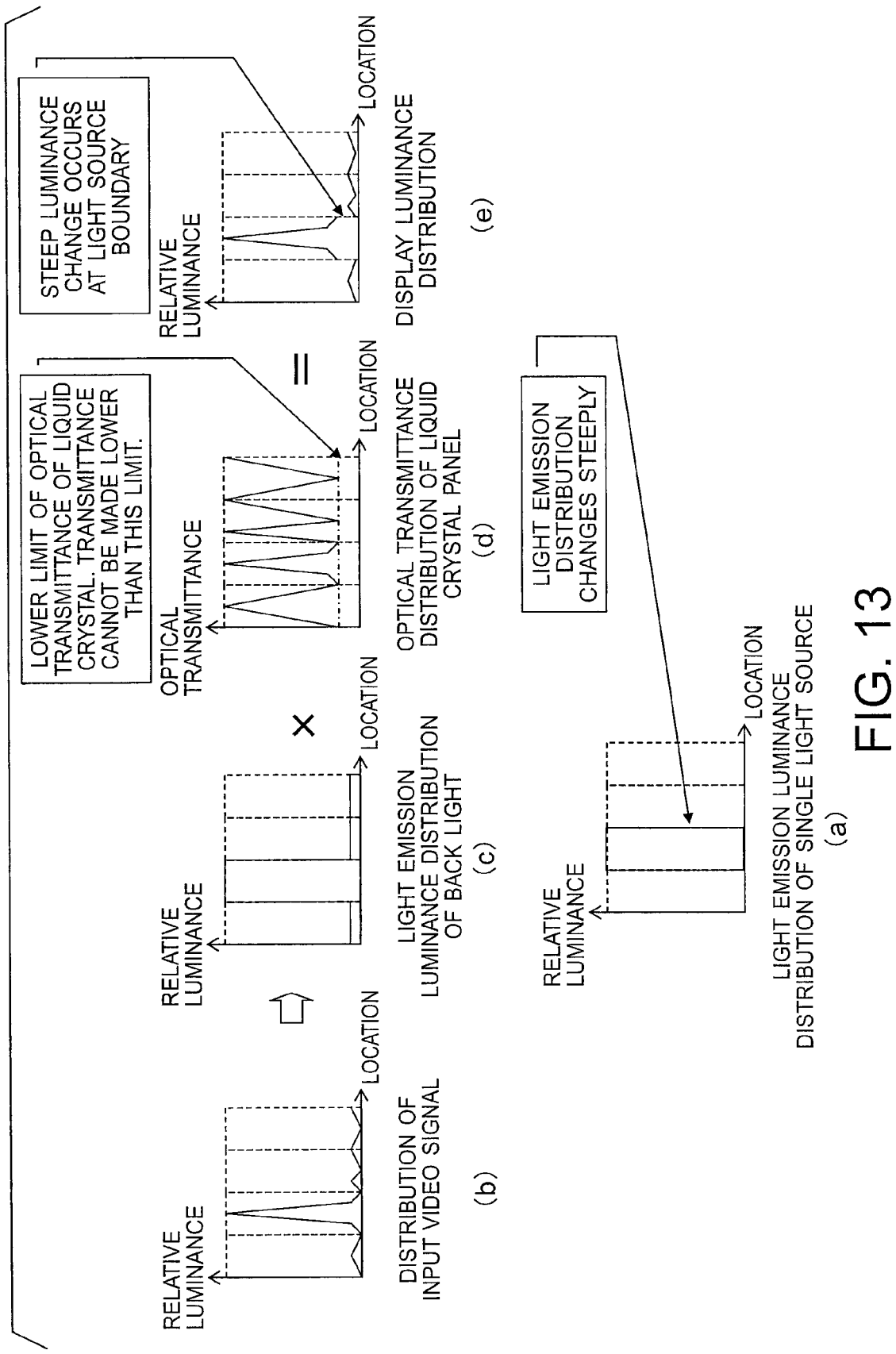
FIGS. 13($a$) to 13($e$) are diagrams for explaining problems caused when light emission luminance distribution of a single light source has a steep change.
Figure 14:
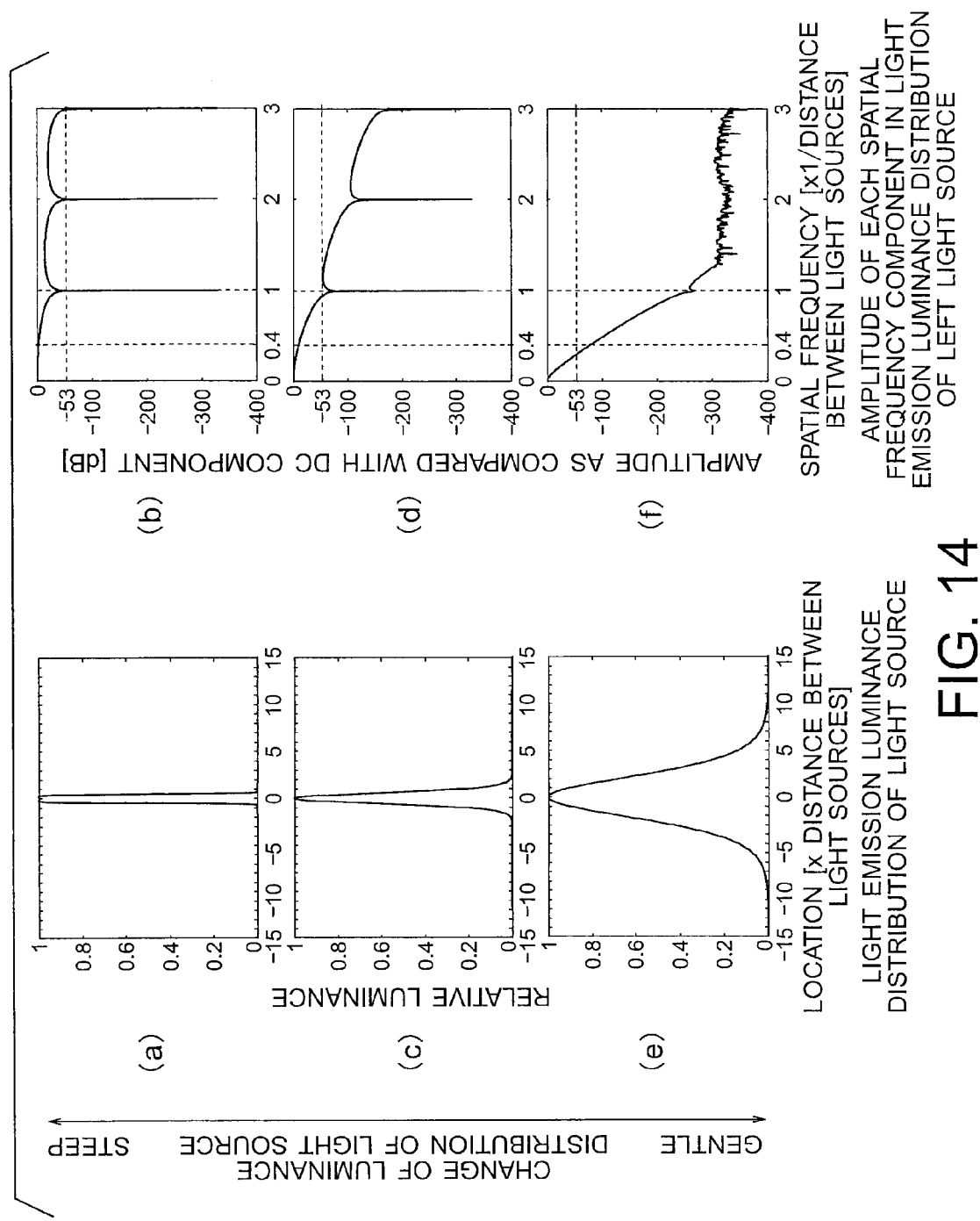
FIGS. 14(a) to 14(f) are diagrams for explaining relations between a shape of luminance distribution of a light source and its spatial frequency components.
Figure 15:
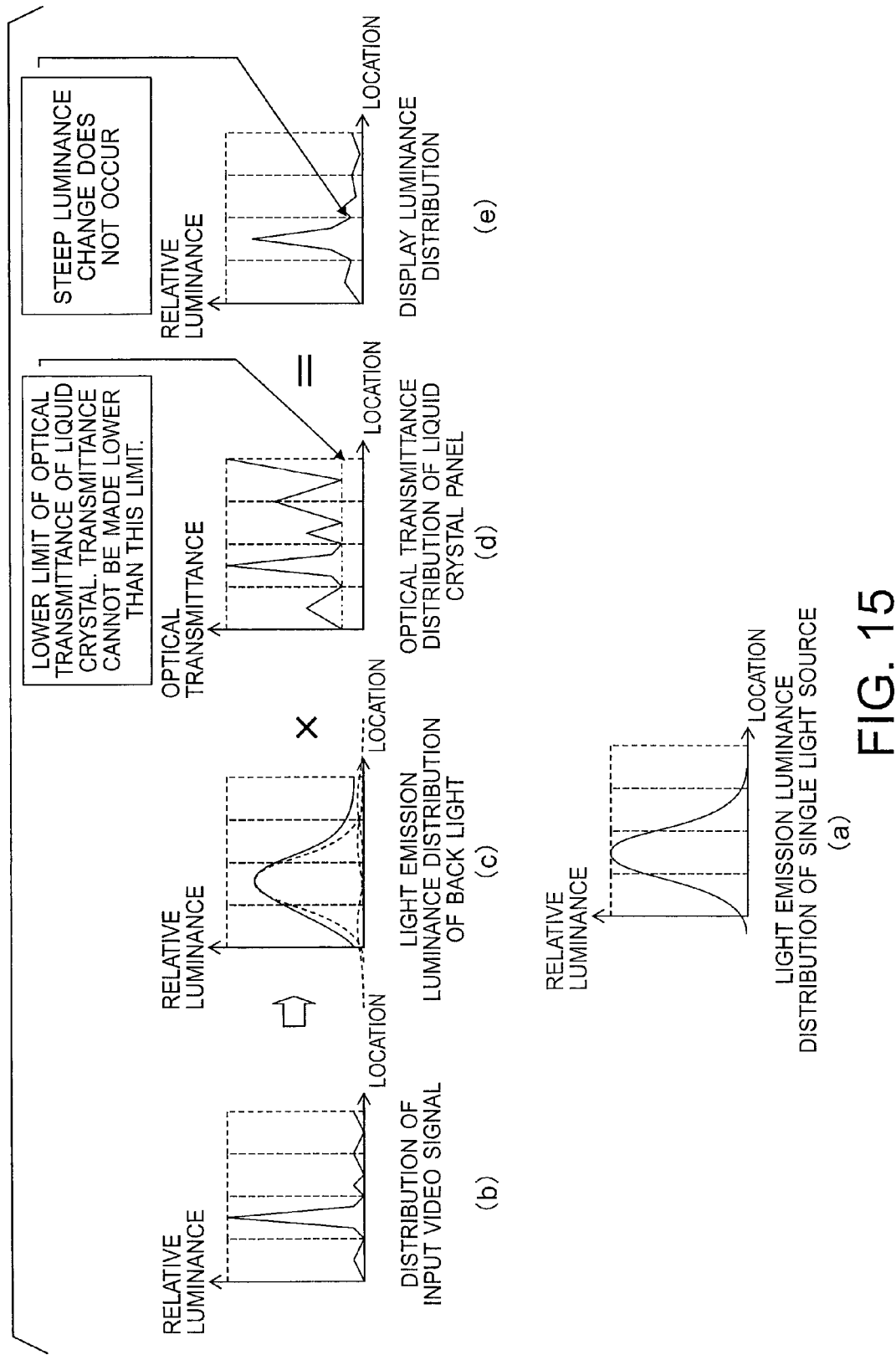
FIGS. 15(a) to 15(e) are diagrams for explaining an effect of the first embodiment.

FIGS. 12A and 12B show an example of light emission luminance distribution of a certain single light source in the liquid crystal display apparatus according to the present embodiment. In FIG. 12B, amplitudes of spatial frequency components in the light emission luminance distribution of the light source are indicated by values compared with the direct current component. In FIGS. 12A and 12B, "distance between light sources" means the shortest distance between a light source center in question and adjacent light source centers. The liquid crystal display apparatus according to the present embodiment has a feature that the amplitude of a spatial frequency component in the light emission luminance distribution of a certain single light source is equal to or less than a first threshold at a spatial frequency which is equal to or greater than 1/(distance between light sources) as shown in FIGS. 12A and 12B. By the way, the first threshold can be made, for example, equal to a minimum contrast which can be perceived by human being.

Effect in the First Embodiment (1) Prior to description of an effect brought about by the present embodiment, problems posed when light emission luminance distribution of a single light source has a steep change will now be described with reference to FIG. 13(a), 13(b), 13(c), 13(d) and 13(e).

The case where the light emission luminance distribution of a single light source changes steeply at boundary parts between light sources as shown in FIG. 13(a) will now be considered. In FIG. 13(a), longitudinal dashed lines are boundaries between light sources. It is supposed that a video signal having spatial distribution shown in FIG. 13(b) is input to the liquid crystal display apparatus. At this time, it is desirable to light the back light 14 brightly in a bright part in the input video signal and light the back light 14 darkly in dark parts in the input video signal. Therefore, each light source on the back light 14 is lit as represented by solid lines in FIG. 13(c). At this time, distribution of light emission luminance of the back light 14 becomes distribution indicated by horizontal solid lines in FIG. 13(c). On the other hand, the video signal correction unit 12b conducts correction on the video signal so as to make the video signal bright in dark parts of the back light 14. As a result, distribution of the optical transmittance of the liquid crystal panel 16 becomes as represented by solid lines in FIG. 13(d). The luminance distribution of the video displayed on the liquid crystal display apparatus becomes as shown by solid lines in FIG. 13(e) and steep luminance changes which are not present in the input video signal take place at boundaries between light sources.

This phenomenon is caused because the changes of the luminance distribution of the back light 14 cannot be compensated fully by correction of the video signal and consequently the changes of the luminance distribution of the back light 14 are reflected into the display video. If such a phenomenon occurs, dark parts around a bright part become bright unnaturally and perceived as luminance unevenness. If light emission luminance distribution of a single light source includes regions where the light emission luminance distribution changes steeply, the luminance unevenness is perceived clearly.

(2) Relations between the shape of the luminance distribution of the light source and its spatial frequency components will now be described with reference to FIGS. 14(a), 14(b), 14(c), 14(d), 14(e) and 14(f). FIGS. 14(a), 14(c) and 14(e) are diagrams showing shapes of the luminance distribution of the light source. FIGS. 14(b), 14(d) and 14(f) are diagrams showing spatial frequency components of the luminance distribution shown in FIGS. 14(a), 14(c) and 14(e), respectively. The shape of the luminance distribution changes from steep to gentle in the order of FIGS. 14(a), 14(c) and 14(e). As appreciated from FIGS. 14(a), 14(b), 14(c), 14(d), 14(e) and 14(f), the steeper change the light emission luminance distribution has, the greater the strength (amplitude) of a high spatial frequency component becomes. The gentler change the light emission luminance distribution has, the smaller the strength (amplitude) of a high spatial frequency component becomes. This is because the light emission luminance distribution having steep changes needs high spatial frequency components in parts where the steep changes are caused. Conversely, luminance distribution which does not contain high spatial frequency components so much does not have steeply changing parts.

In the light emission luminance distribution of a single light source in the present embodiment, an amplitude of a component having a spatial frequency of at least 1/(distance between light sources) is restricted so as to become equal to or less than the first threshold and amplitude (strength) of high spatial frequency components is small. In other words, in the light source in the present embodiment, changes of the light emission luminance distribution are gentle over the whole light emission luminance distribution as compared with a light source having a high spatial frequency component which is equal to or greater than the first threshold in its light emission luminance distribution.

(3) An effect brought about by the present embodiment will now be described with reference to FIGS. 15(a), 15(b), 15(c), 15(d) and 15(e).

In the light emission luminance distribution of a single light source in the present embodiment, changes of the light emission luminance distribution are gentle over the whole light emission luminance distribution as shown in FIG. 15(a) as described above. It is supposed that a video signal having spatial distribution shown in FIG. 15(b) is input to the liquid crystal display apparatus. At this time, it is desirable to light the back light 14 brightly in a bright part in the input video signal and light the back light 14 darkly in dark parts in the input video signal. Therefore, each light source on the back light 14 is lit as represented by dashed lines in FIG. 15(c). At this time, distribution of light emission luminance of the back light 14 becomes distribution indicated by solid lines in FIG. 15(c). On the other hand, the video signal correction unit 12b conducts correction on the video signal so as to make the video signal bright in dark parts of the back light 14. As a result, distribution of the optical transmittance of the liquid crystal panel 16 becomes as represented by solid lines in FIG. 15(d). As a result of them, the luminance distribution of the video displayed on the liquid crystal display apparatus becomes as represented by a solid line in FIG. 15(e).

Thus, in the liquid crystal display apparatus according to the present embodiment, steep luminance changes which do not exist in the input video signal do not occur in the display video unlike the case where light emission luminance distribution of a single light source includes regions where the light emission luminance distribution changes steeply. In the liquid crystal display apparatus according to the present embodiment as well, there is a possibility of occurrence of the phenomenon that the changes of the luminance distribution of the back light 14 cannot be compensated fully even if the video signal is corrected and consequently the changes of the luminance distribution of the back light 14 are reflected into the display video, in the same way as the case where the light emission luminance distribution of a single light source includes regions where the light emission luminance distribution changes steeply. Even if luminance changes which do not exist in the input video signal occur in the display video, however, the luminance changes are not steep changes in the liquid crystal display apparatus according to the present embodiment, because the light emission luminance distribution of a single light source does not include regions where the light emission luminance distribution changes steeply.

In general, vision of the human being is low in sensitivity to a gentle luminance change having a low spatial frequency. Even if luminance unevenness is caused by the principle described heretofore, therefore, the viewer is hard to perceive it on the liquid crystal display apparatus according to the present embodiment. In this way, the liquid crystal display apparatus according to the present embodiment brings about an effect that luminance unevenness is hard to be perceived because high frequency components in light emission luminance distribution of each light source are weak.

Light Source

A light source according to the present embodiment will now be described with reference to FIGS. 16(a) to 18(f).

First, the fact that the shape of light emission luminance distribution of a single light source can be adjusted by adjusting the distance between the light source of the back light and the liquid crystal panel will now be described.

FIG. 16(a) is a schematic diagram showing the case where the distance between the light source 14a of the back light 14 and the liquid crystal panel 16 is shortened as compared with FIG. 16(c). FIGS. 16(b) and 16(d) are diagrams showing light emission luminance distribution of a single light source obtained when the distance between the light source 14a and the liquid crystal panel 16 is that shown in FIG. 16(a) and FIG. 16(c), respectively.

Figure 16:
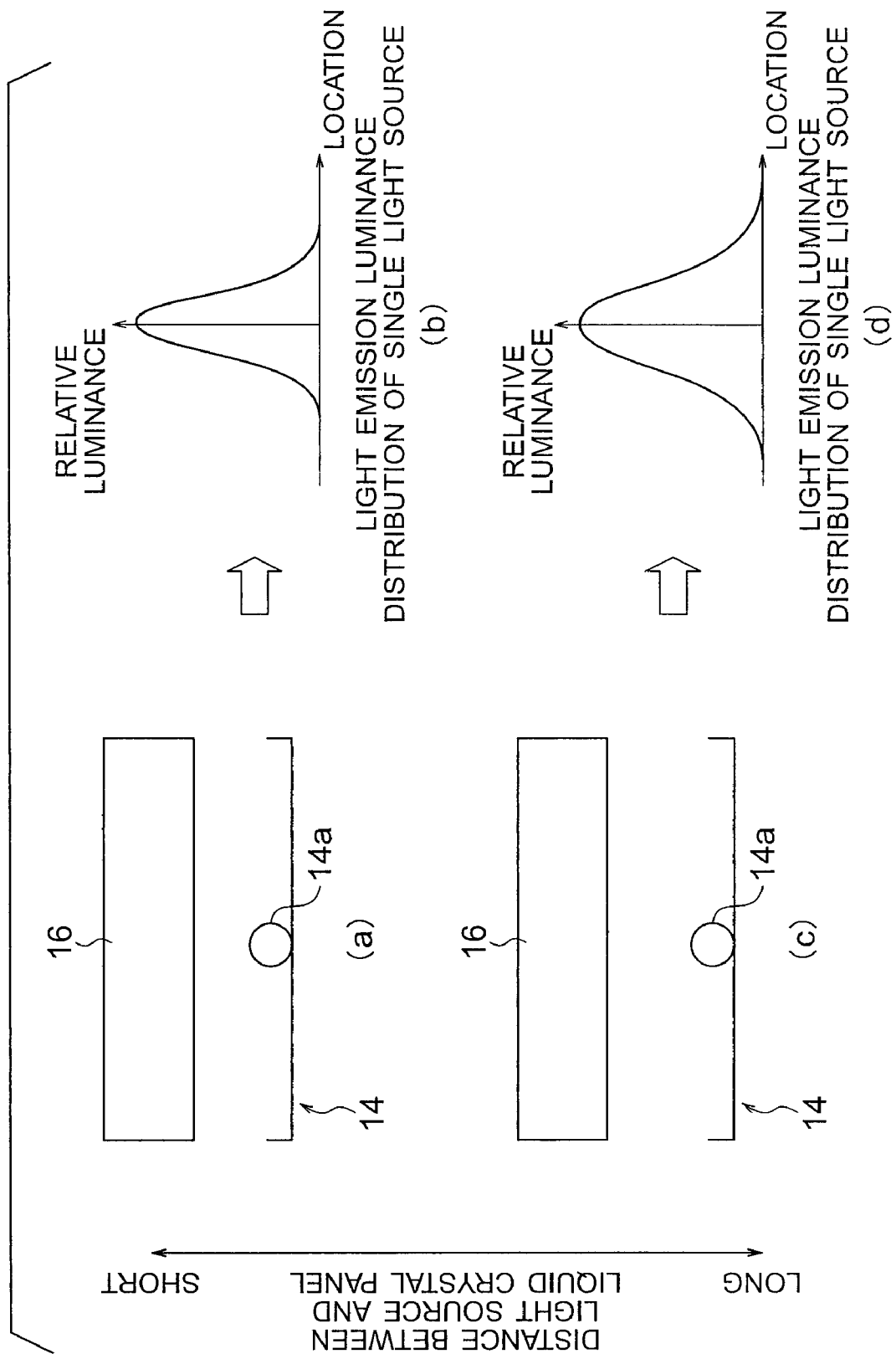
FIGS. 16(a) to 16(d) are diagrams for explaining a light source adjustment method in the first embodiment.

In general, light emission luminance distribution of the light source 14a formed of a single light emission element becomes distribution shown in FIG. 16(b) or FIG. 16(d). The width of the light emission luminance distribution can be adjusted by adjusting the distance between the light source 14a and the liquid crystal panel 16 as shown in FIG. 16(a) and FIG. 16(*c*). If the distance between the light source 14*a* and the liquid crystal panel 16 is made long to widen the width of the light emission luminance distribution, high spatial frequency components in the light emission luminance distribution become weak, resulting in gentle light emission luminance distribution. If the distance between the light source 14*a* and the liquid crystal panel 16 is made short to narrow the width of the light emission luminance distribution, high spatial frequency components in the light emission luminance distribution become strong, resulting in steep light emission luminance distribution.

The fact that the shape of the light emission luminance distribution of a single light source can be adjusted by adjusting diffusivity of an optical diffusion sheet inserted between the light source of the back light and the liquid crystal panel will now be described.

Figure 17:
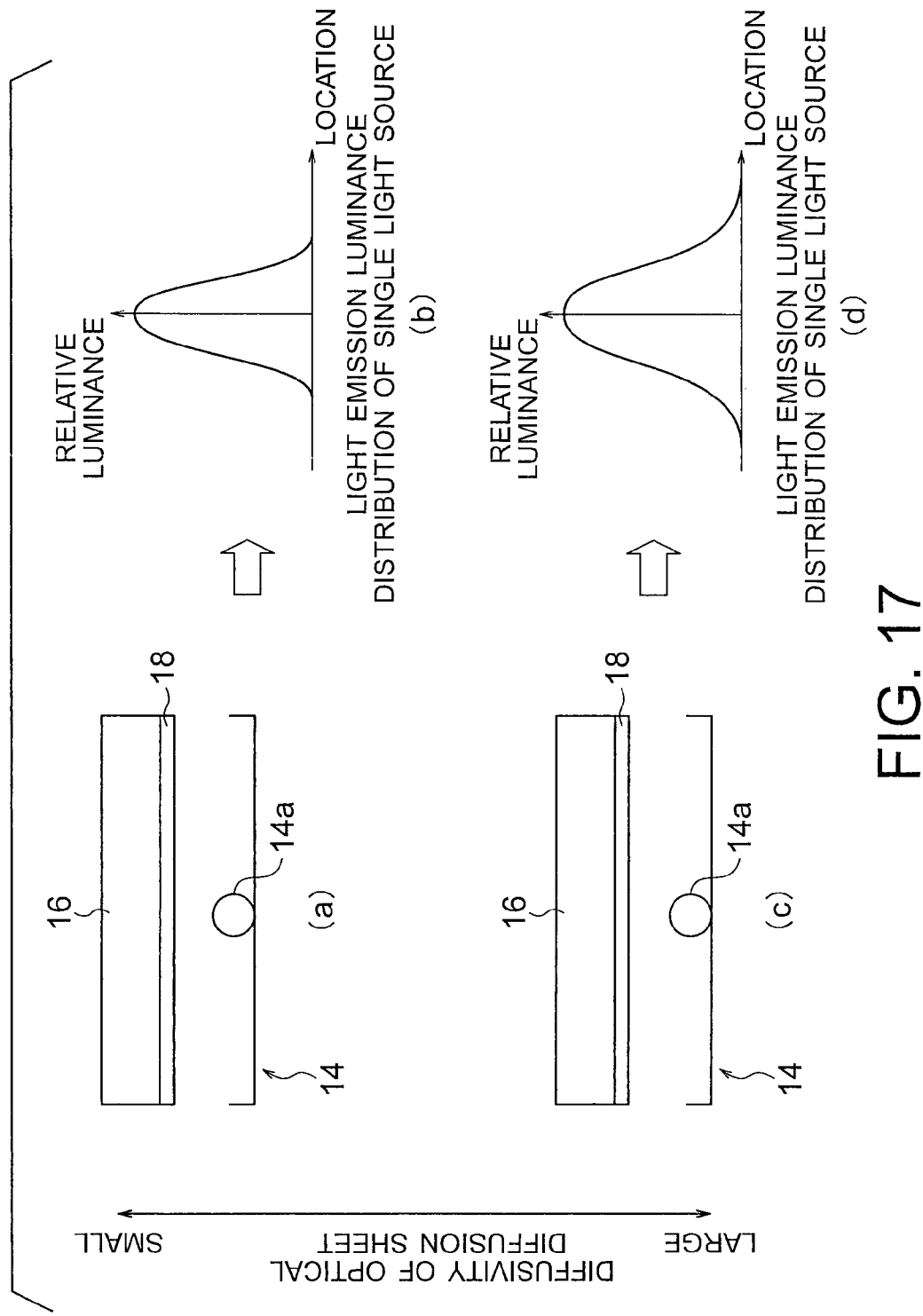
FIGS. 17(a) to 17(d) are diagrams for explaining a light source adjustment method in the first embodiment.

FIGS. 17(*a*) and 17(*c*) are schematic diagrams showing the case where an optical diffusion sheet 18 is inserted between the light source 14*a* of the back light 14 and the liquid crystal panel 16. FIG. 17(*a*) shows a case where an optical diffusion sheet 18 having a diffusivity which is lower than that shown in FIG. 17(*c*). FIGS. 17(*b*) and 17(*d*) are diagrams showing light emission luminance distribution of a single light source obtained when the diffusivity of the optical diffusion sheet is that shown in FIGS. 17(*a*) and 17(*c*), respectively.

In this way, the shape of the light emission luminance distribution of the light source 14*a* can also be adjusted by inserting the optical diffusion sheet 18 between the light source 14*a* and the liquid crystal panel 16 as shown in FIGS. 17(*a*) and 17(*c*). The optical diffusion sheet 18 plays a role of an optical low-pass filter on the light emission luminance distribution of the light source 14*a*. By making the optical diffusivity of the optical diffusion sheet 18 inserted between the light source 14*a* and the liquid crystal panel 16 large, high spatial frequency components in the light emission luminance distribution of the light source 14*a* become weak, resulting in gentle light emission luminance distribution. On the other hand, by making the optical diffusivity of the optical diffusion sheet 18 inserted between the light source 14*a* and the liquid crystal panel 16 small, high spatial frequency components in the light emission luminance distribution of the light source 14*a* become strong, resulting in steep light emission luminance distribution. In the case where the optical diffusivity of the optical diffusion sheet 18 inserted between the light source 14*a* and the liquid crystal panel 16 is adjusted, not only the width of the light emission luminance distribution is changed but also the shape of the light emission luminance distribution is changed unlike the case where the distance between the light source 14*a* and the liquid crystal panel 16 is adjusted, as appreciated from FIGS. 17(*b*) and 17(*d*).

Figure 18:
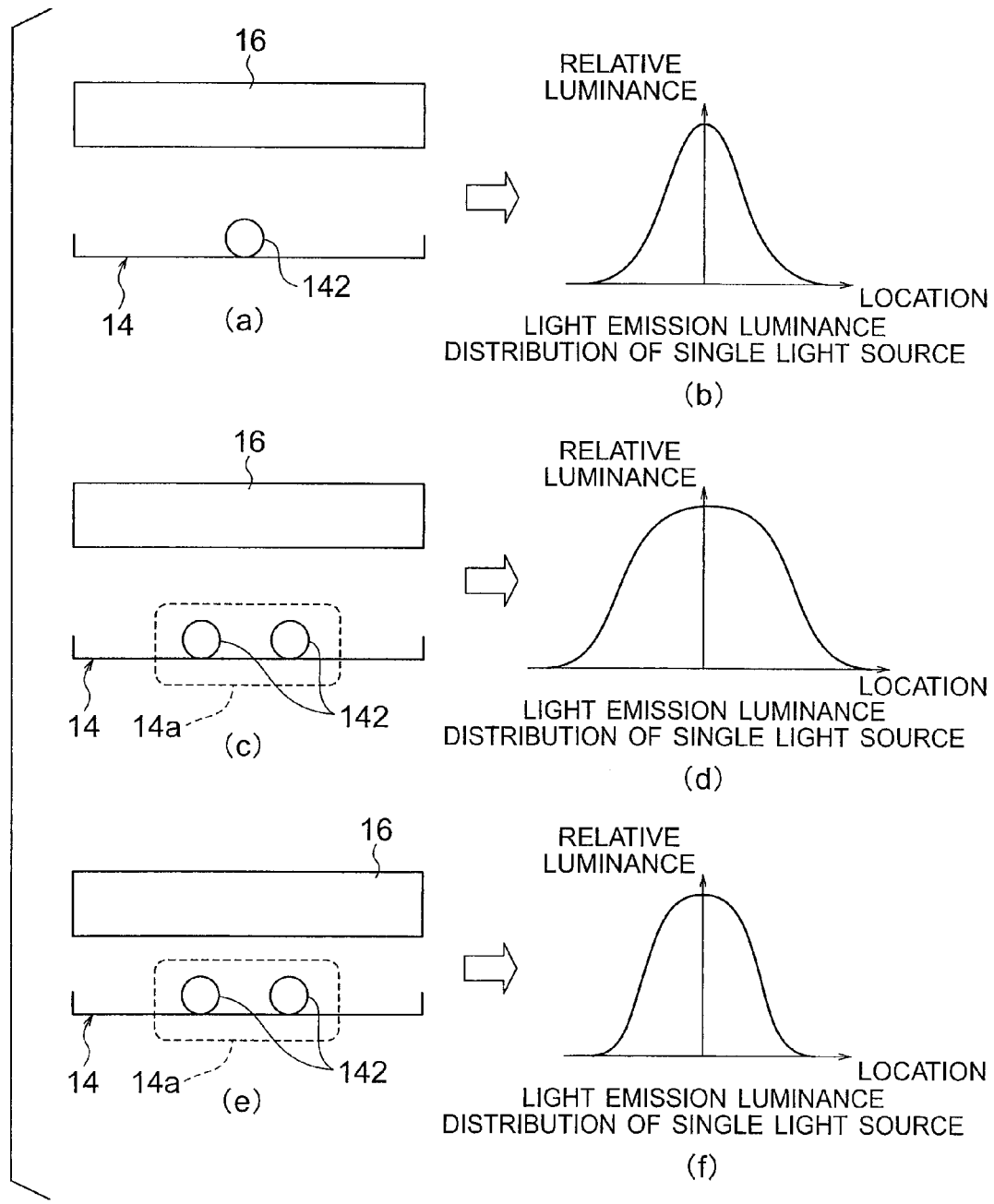
FIGS. 18(a) to 18(f) are diagrams for explaining a light source adjustment method in the first embodiment.

The fact that the shape of the light emission luminance distribution of the light source can also be adjusted by adjusting the disposition of light emitting devices forming the light source will now be described. FIGS. 18(*a*), 18(*c*) and 18(*e*) are schematic diagrams showing the case where disposition of light emitting devices forming the light source is changed. FIGS. 18(*b*), 18(*d*) and 18(*f*) are diagrams showing light emission luminance distribution of a single light source obtained when light emitting device(s) is disposed as shown in FIGS. 18(*a*), 18(*c*) and 18(*e*), respectively. FIG. 18(*a*) shows a case where the light source 14*a* is formed of one light emitting device 142. FIG. 18(*c*) shows a case where the light source 14*a* is formed of two light emitting devices 142. FIG. 18(*e*) shows a case where the light source 14*a* is formed of two light emitting devices 142 in the same way as FIG. 18(*c*) and the distance between the light source 14*a* and the liquid crystal panel 16 is made shorter than that shown in FIG. 18(*c*).

Comparing FIG. 18(*b*) with FIG. 18(*d*), FIG. 18(*b*) is the same as FIG. 18(*d*) in change quantities of luminance distribution in the rising part and the falling part of light emission luminance distribution, but FIG. 18(*b*) is different from FIG. 18(*d*) in locations of luminance distribution in the rising part and the falling part. In addition, in FIG. 18(*e*), adjustment of the distance between the light source 14*a* and the liquid crystal panel 16 is also combined. FIG. 18(*b*) is the same as FIG. 18(*f*) in locations of luminance distribution in the rising part and the falling part, but FIG. 18(*b*) is different from FIG. 18(*f*) in change quantities of luminance distribution in the rising part and the falling part. In other words, FIG. 18(*b*) is the same as FIG. 18(*f*) in width of light emission luminance distribution. In the light emission luminance distribution shown in FIG. 18(*b*), however, high spatial frequency components are weak, resulting in gentle changes. In the light emission luminance distribution shown in FIG. 18(*f*), high spatial frequency components are strong, resulting in steep changes.

In this way, it is possible to adjust locations at which the light emission luminance distribution changes by adjusting the disposition of the light emitting device(s) 142 forming the light source 14*a*. In addition, it is possible to change the steepness without changing the locations at which the light emission luminance distribution changes by combining adjustment of the distance between the light source 14*a* and the liquid crystal panel 16.

It is possible to adjust the light emission luminance distribution of the light source in various ways by using a combination of these techniques. As a result, the light source according to the first embodiment can be implemented.

Figure 19:
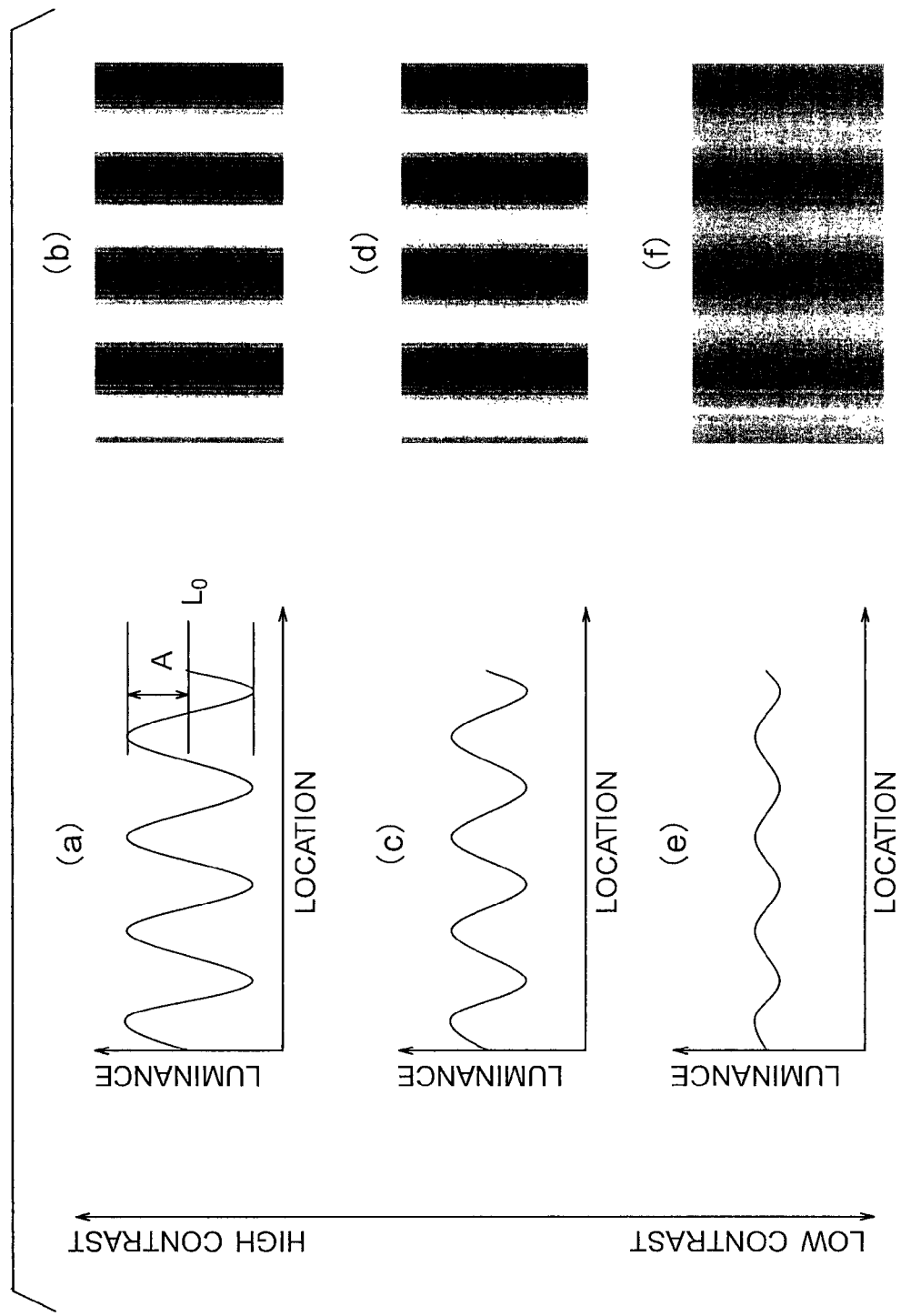
FIGS. 19(a) to 19(f) are diagrams showing how to find a contrast threshold.

Light emission luminance distribution of the light source obtained when the first threshold described with reference to FIGS. 12A and 12B is a minimum contrast which can be perceived by human being will now be described with reference to FIG. 19(*a*) to FIG. 19(*f*). The minimum contrast which can be perceived by human being is called contrast threshold. FIGS. 19(*a*), 19(*c*) and 19(*e*) are waveform diagrams obtained when stimulus amplitude is changed. The stimulus amplitude becomes small in the order of FIGS. 19(*a*), 19(*c*) and 19(*e*). FIGS. 19(*b*), 19(*d*) and 19(*f*) are photographs showing videos corresponding to FIGS. 19(*a*), 19(*c*) and 19(*e*), respectively. In FIG. 19(*a*), $L_0$ denotes a center value of stimulus and A denotes amplitude (one-side amplitude) of stimulus. The contrast threshold can be found experimentally as a minimum contrast ($A/L_0$) which can be perceived by a subject when the stimulus amplitude is changed as shown in FIG. 19(*a*) to FIG. 19(*f*). It is generally known that the contrast threshold thus found differs depending upon the spatial frequency of stimulus. The first threshold in the present embodiment may be a minimum value of the contrast threshold at a spatial frequency of at least 1/(distance between light sources), or may be a minimum value of the contrast threshold over the whole spatial frequency. Since generally well known minimum value of the contrast threshold is approximately −53 dB, the first threshold may be set equal to −53 dB. The light source in this case can be implemented in the same way as the foregoing description.

Thus, in the present embodiment, the amplitude of a spatial frequency component of light emission luminance distribution of a certain single light source can be made equal to or less than the minimum contrast which can be perceived by human being at a spatial frequency of at least 1/(distance between light sources). Therefore, it is possible to prevent spatial frequency components of at least 1/(distance between light sources) in the light emission luminance distribution of the light source from being perceived by human being.

Remaining spatial frequency components of 1/(distance between light sources) or less are components required to provide the back light with luminance undulations.

In the light emission luminance distribution of the light source in the liquid crystal display apparatus according to the present embodiment, unnecessary components are removed sufficiently, the boundary part between light sources is sufficiently hard to be perceived, and luminance unevenness is sufficiently hard to be perceived, as heretofore described.

According to the present embodiment, luminance unevenness can be suppressed and the contrast improving effect can be prevented from being weakened as far as possible as heretofore described.

Second Embodiment

A liquid crystal display apparatus according to a second embodiment of the present invention will now be described.

The liquid crystal display apparatus according to the second embodiment is the same in basic configuration as that according to the first embodiment. However, the liquid crystal display apparatus according to the second embodiment has a feature that amplitude of spatial frequency components in light emission luminance distribution of a single light source is equal to or greater than a second threshold over a spatial frequency range from the spatial frequency of the direct current component to a first spatial frequency.

Light Emission Luminance Distribution of Light Source

Figure 20B:
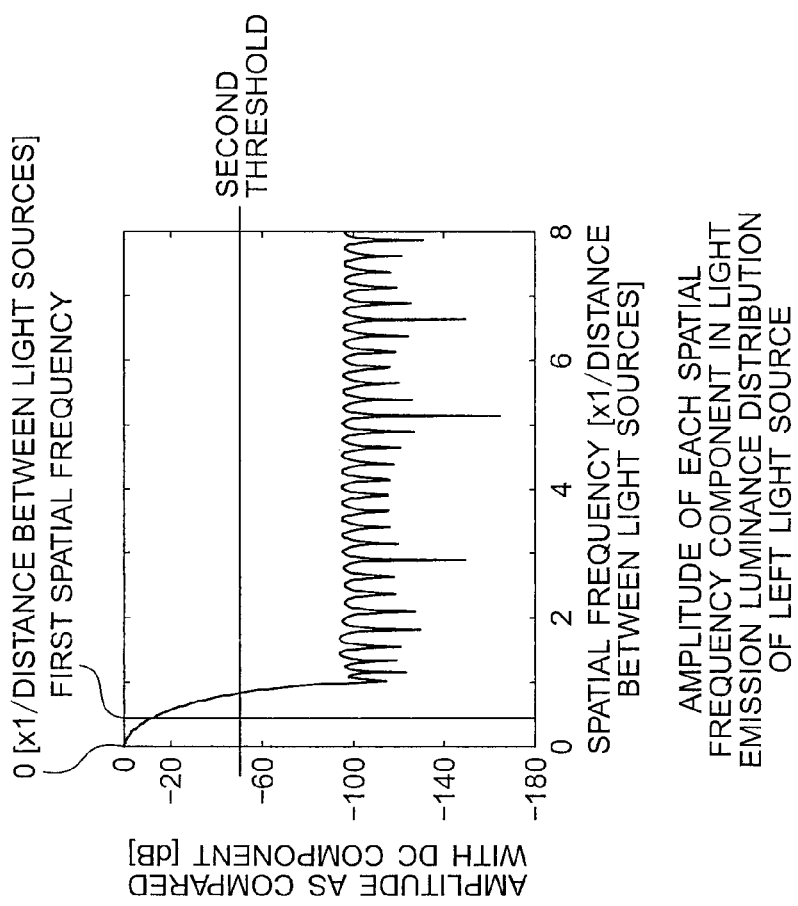
FIGS. 20A and 20B are diagrams showing an example of light emission luminance distribution of a light source in a liquid crystal display apparatus according to a second embodiment.
Figure 20A:
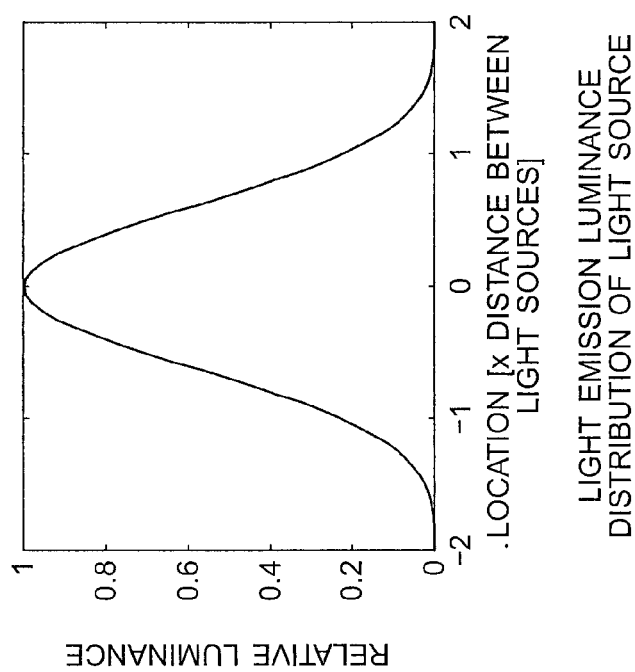

An example of light emission luminance distribution of a certain single light source in the liquid crystal display apparatus according to the present embodiment is shown in FIGS. 20A and 20B. FIG. 20A is a diagram showing light emission luminance distribution of a light source according to the present embodiment. FIG. 20B is a diagram showing amplitudes of spatial frequency components in the light emission luminance distribution shown in FIG. 20A. In FIG. 20B, amplitudes of spatial frequency components in the light emission luminance distribution of the light source are indicated by values compared with the direct current component. In FIGS. 20A and 20B, "distance between light sources" means the shortest distance between a light source center in question and adjacent light source centers. In addition, a component having a spatial frequency of 0 [×1/distance between light sources] shown in FIG. 20B is a constant component having luminance which does not change spatially, and it is called direct current component. Herein, the spatial frequency of the direct current component (0 [×1/distance between light sources] is referred to as spatial frequency 0.

The liquid crystal display apparatus according to the second embodiment has a feature that the amplitude of a spatial frequency component in the light emission luminance distribution of a certain single light source is equal to or greater than the second threshold over a spatial frequency range from the spatial frequency of the direct current component (0 [×1/distance between light sources] to a first spatial frequency. The first spatial frequency [×1/distance between light sources] has a value which is greater than 0 and which is less than 1. The first spatial frequency [×1/distance between light sources] is, for example, 0.4/(distance between light sources). The second threshold is a minimum contrast which can be perceived by human being. The light source according to the present embodiment can be implemented as described with respect to the first embodiment.

Effect

An effect brought about by the present embodiment will now be described.

First, problems posed when light emission luminance distribution of a single light source has gentle changes over the whole will now be described with reference to FIGS. 21(a), 21(b), 21(c) and 21(d).

Figure 21:
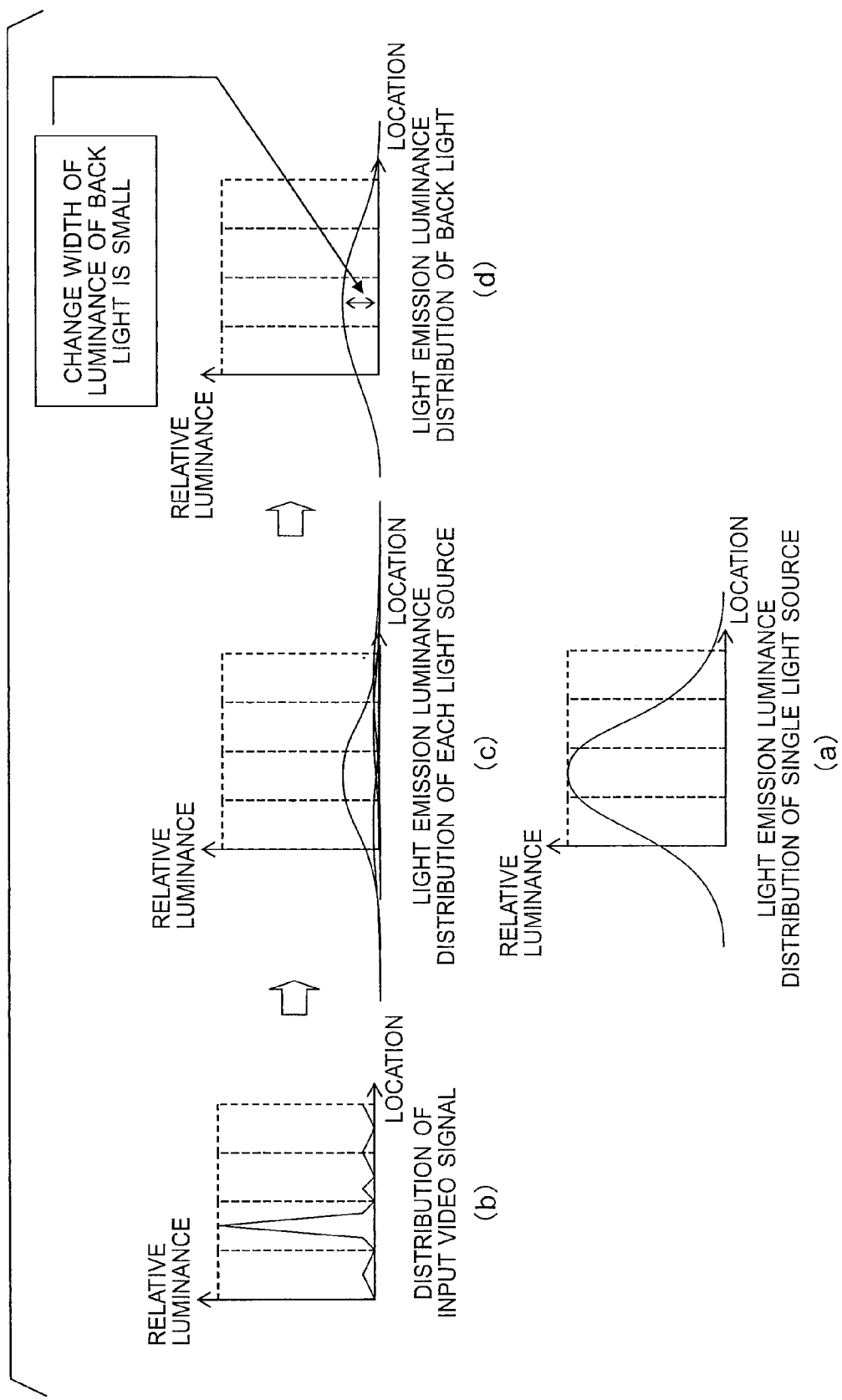
FIGS. 21(a) to 21(d) are diagrams for explaining problems caused when light emission luminance distribution of a single light source has a gentle change.

The case where light emission luminance distribution of a single light source changes gently over the whole of the light emission luminance distribution as shown in FIG. 21(a) will now be considered. In FIG. 21(a), longitudinal dashed lines are boundaries between light sources. It is supposed that a video signal having spatial distribution shown in FIG. 21(b) is input to the liquid crystal display apparatus. At this time, it is desirable to light the back light brightly in a bright part in the input video signal and light the back light darkly in dark parts in the input video signal. Therefore, each light source on the back light is lit as represented by solid lines in FIG. 21(c). At this time, distribution of light emission luminance of the back light becomes distribution indicated by a solid line in FIG. 21(d). As appreciated by comparing FIG. 21(b) with FIG. 21(d), the change width of the light emission luminance on the back light becomes smaller than the change width of the luminance in the input video. "The change width of the light emission luminance on the back light is small" means that the effect obtained by controlling the light emission luminance every light source is weak. In other words, it becomes impossible to conduct video display with a high contrast and modulation. This can be understood easily by considering a back light which has a light source changing in luminance more gently, in which mere lighting of a single light source makes the whole surface of the back light bright uniformly. In this case, the luminance on the whole surface of the back light changes merely uniformly whichever light source is lit. Therefore, it becomes utterly impossible to provide the luminance distribution of the back light with undulations in the spatial direction by exercising luminance control of the light source. In other words, the meaning of exercising luminance control independently every light source is utterly lost.

Relations between the shape of the luminance distribution of the light source and its spatial frequency components will now be described with reference to FIG. 14(a) to FIG. 14(f). FIG. 14(a) to FIG. 14(f) are diagrams showing relations between the shape of the luminance distribution of the light source and spatial frequency components of the luminance distribution. As appreciated from FIG. 14(a) to FIG. 14(f), the gentler change the light emission luminance distribution has, as far as a lower spatial frequency component the strength (amplitude) becomes small. The steeper change the light emission luminance distribution has, as far as a higher spatial frequency component the strength (amplitude) becomes large. This is because the light emission luminance distribution having steeper changes needs up to higher spatial frequency components. Conversely, light emission luminance distribution containing large strength (amplitude) components up to a higher spatial frequency can have a steeper change.

In the light emission luminance distribution of a single light source in the present embodiment, an amplitude of a component ranging from the spatial frequency of the direct current component (0 [×1/distance between light sources] to the first spatial frequency is restricted so as to become equal to or greater than the second threshold and amplitude (strength) of low spatial frequency components is sufficiently large. In other words, the light source in the present embodiment can have steeper changes as compared with a light source in which the strength (amplitude) of light emission luminance distribution becomes equal to or less than the second threshold between the spatial frequency of the direct current component (0 [×1/distance between light sources] and the first spatial frequency.

An effect brought about by the present embodiment will now be described with reference to FIGS. 22(a) to 22(d).

Figure 22:
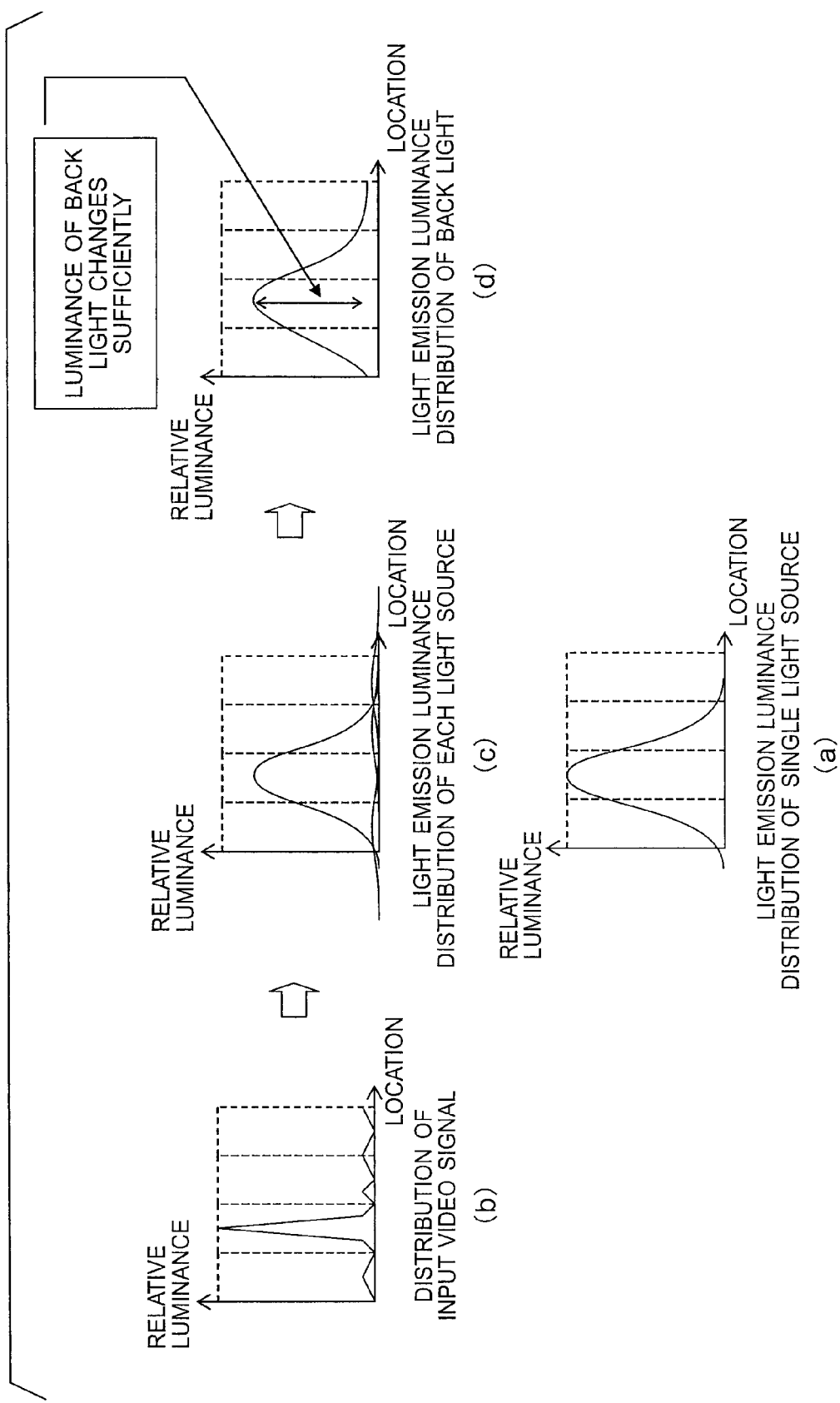
FIGS. 22(a) to 22(d) are diagrams for explaining an effect of the second embodiment.

In the light emission luminance distribution of a single light source in the present embodiment, changes of the light emission luminance distribution are steep as shown in FIG. 22(a) as described above. It is supposed that a video signal having spatial distribution shown in FIG. 22(b) is input to the liquid crystal display apparatus. At this time, it is desirable to light the back light 14 brightly in a bright part in the input video signal and light the back light 14 darkly in dark parts in the input video signal. Therefore, each light source on the back light is lit as represented by a solid line in FIG. 22(c). At this time, distribution of light emission luminance of the back light becomes distribution indicated by a solid line in FIG. 22(d). Thus, in the liquid crystal display apparatus according to the present embodiment, the change width of the light emission luminance of the back light is large unlike the case where the light emission luminance distribution of a single light source has gentle changes. Large change width of the light emission luminance of the back light means that the effect brought about by controlling the light emission luminance every light source is great. In other words, it is sufficiently possible to conduct video display with a high contrast and modulation.

In this way, the liquid crystal display apparatus according to the present embodiment brings about an effect that video display can be conducted with a high contrast and modulation because low frequency components in light emission luminance distribution of each light source are sufficiently strong.

Features in the case where in the present embodiment the first spatial frequency is 0.4/(distance between light sources) and the second threshold is a minimum contrast which can be perceived by human being will now be described.

The minimum contrast which can be perceived by human being is called contrast threshold. The contrast threshold can be found experimentally as a minimum contrast ($A/L_0$) which can be perceived by a subject when the stimulus amplitude is changed as already described in the first embodiment. It is generally known that the contrast threshold thus found differs depending upon the spatial frequency of stimulus. The second threshold in the present embodiment may be a minimum value of the contrast threshold at a spatial frequency of 0.4/(distance between light sources) or less, or may be a minimum value of the contrast threshold over the whole spatial frequency. Since generally well known minimum value of the contrast threshold is approximately −53 dB, the second threshold may be set equal to −53 dB. The light source in this case can be implemented in the same way as the description in the first embodiment.

In general, with respect to a sampling interval, 1/(sampling interval) is called sampling frequency, and 0.5/(sampling interval) is called Nyquist frequency. Speaking as regards the back light, with respect to the distance between light sources of the back light, 1/(distance between light sources) is the sampling frequency of the back light and 0.5/(distance between light sources) is the Nyquist frequency of the back light. As for a signal sampled at a certain sampling interval, its components of the Nyquist frequency or less can be reproduced by an output apparatus having its sampling interval, but signal components having a frequency larger than the Nyquist frequency cannot be reproduced. In general, this is called sampling theorem. Speaking as regards the back light, components of luminance setting values of the back light having spatial frequencies of 0.5/(distance between light sources) or less can be displayed, but components having spatial frequencies larger than 0.5/(distance between light sources) cannot be displayed.

On the other hand, when lighting the back light according to the luminance setting values of the back light, light emission luminance distribution of each light source on the back light acts as an optical low-pass filter on the luminance setting values of the back light. The spatial frequency response of the optical low-pass filter is the same as the strength distribution of spatial frequency components of light emission luminance distribution of each light source. When lighting the back light according to the luminance setting values of the back light, therefore, components of the luminance setting values of the back light which are weak in strength of the light emission luminance distribution of the light source are displayed with weakened strength.

On the other hand, according to the sampling theorem, components of the luminance setting values of the backlight having a spatial frequency of 0.5/(distance between light sources) or less can be displayed. Therefore, it is desirable that components of the luminance setting values of the backlight having a spatial frequency of 0.5/(distance between light sources) or less are displayed without being weakened as far as possible. Therefore, it can be said that the amplitude (strength) of components having a spatial frequency of 0.5/(distance between light sources) or less in the light emission luminance distribution of a single light source is large as far as possible.

In light emission luminance distribution of a certain single light source in the present embodiment, its strength (amplitude) is sufficiently large at frequencies of the spatial frequency of 0.4/(distance between light sources) which is not the strict Nyquist frequency. Therefore, it becomes possible to sufficiently display undulations of luminance of the back light in a range which can be represented by the luminance setting values of the back light.

In other words, in the present embodiment, it is possible to make the change width of light emission luminance of the back light sufficiently large, the effect brought about by controlling the light emission luminance every light source are sufficiently great, and it is sufficiently possible to conduct video display with a high contrast and modulation. In this way, in the liquid crystal display apparatus according to the present embodiment, low frequency components in the light emission luminance distribution of each light source is sufficiently strong, and consequently an effect that video display with a high contrast and modulation can be conducted is brought about.

According to the present embodiment, luminance unevenness can be suppressed and the contrast improving effect can be prevented from being weakened as far as possible as heretofore described.

Third Embodiment

A liquid crystal display apparatus according to a third embodiment of the present invention will now be described.

The liquid crystal display apparatus according to the present embodiment is the same in basic configuration as that according to the first embodiment. However, the liquid crystal display apparatus according to the present embodiment has a feature that amplitude of spatial frequency components in light emission luminance distribution of a single light source is equal to or less than a first threshold at spatial frequencies of at least 1/(distance between light sources) and is equal to or greater than a second threshold over a spatial frequency range from the spatial frequency of the direct current component to a first spatial frequency. In other words, the liquid crystal display apparatus according to the present embodiment has a feature obtained by combining the feature of the liquid crystal display apparatus according to the first embodiment and the feature of the liquid crystal display apparatus according to the second embodiment.

Light Emission Luminance Distribution of Light Source

Figure 23B:
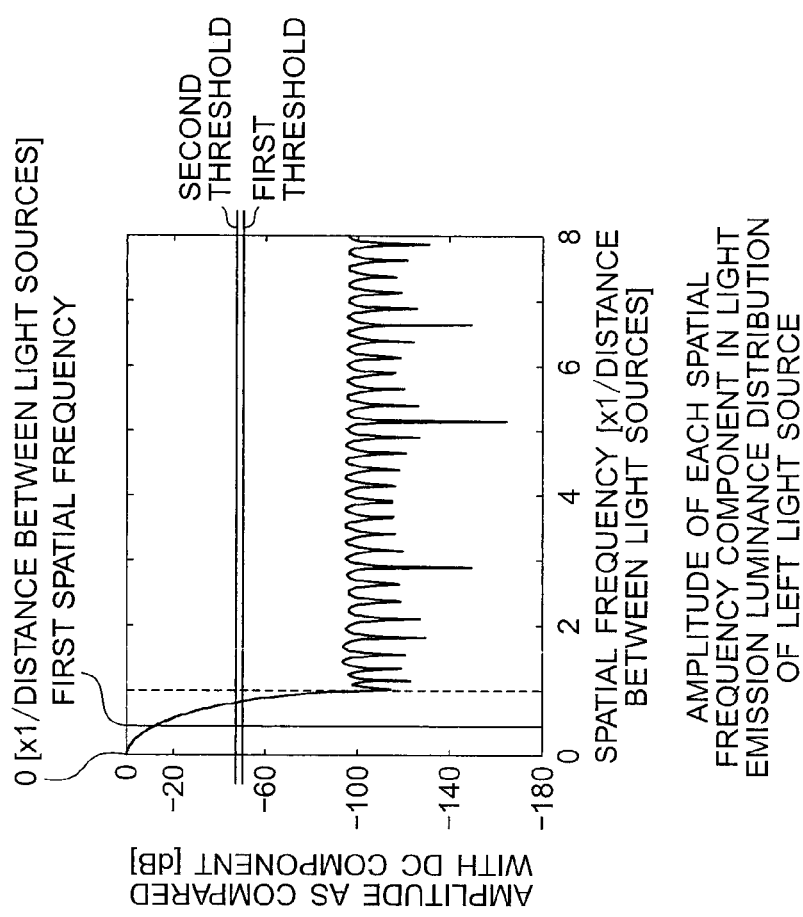
FIGS. 23A and 23B are diagrams showing an example of light emission luminance distribution of a light source in a liquid crystal display apparatus according to a third embodiment.
Figure 23A:
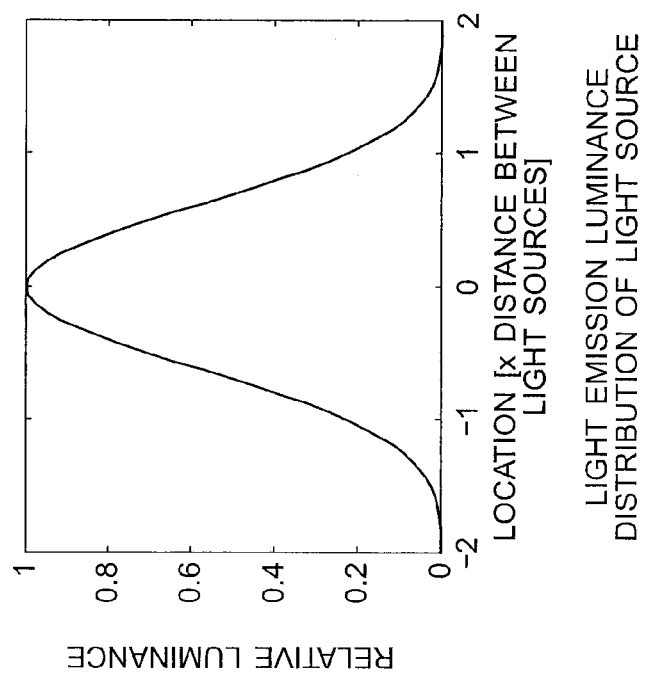

An example of light emission luminous distribution of a certain single light source in the liquid crystal display apparatus according to the present embodiment is shown in FIGS. 23A and 23B. FIG. 23A is a diagram showing light emission luminance distribution of a light source according to the present embodiment. FIG. 23B is a diagram showing amplitudes of spatial frequency components in the light emission luminance distribution shown in FIG. 23A. In FIG. 23B, amplitudes of spatial frequency components in the light emission luminance distribution of the light source are indicated by values compared with the direct current component.

In FIGS. 23A and 23B, "distance between light sources" means the shortest distance between a light source center in question and adjacent light source centers. In addition, a component having a spatial frequency of 0 [×1/distance between light sources] shown in FIG. 23B is a constant component having luminance which does not change spatially, and it is called direct current component. Herein, the spatial frequency of the direct current component (0 [×1/distance between light sources] is referred to as spatial frequency 0.

The liquid crystal display apparatus according to the present embodiment has a feature that the amplitude of a spatial frequency component in the light emission luminance distribution of a certain single light source is equal to or less than a first threshold at spatial frequencies of at least 1/(distance between light sources) and is equal to or greater than a second threshold over a spatial frequency range from the spatial frequency of the direct current component to a first spatial frequency, as shown in FIGS. 23A and 23B. The light source according to the present embodiment can be implemented in the same way as described with respect to the first embodiment.

The liquid crystal display apparatus according to the present embodiment has both the feature of the liquid crystal display apparatus according to the first embodiment and the feature of the liquid crystal display apparatus according to the second embodiment. As described in the effect in the first embodiment, the liquid crystal display apparatus according to the present embodiment brings about the effect that luminance unevenness is hard to be perceived because high frequency components in light emission luminance distribution of each light source are weak. As described in the effect in the second embodiment, the liquid crystal display apparatus according to the present embodiment brings about the effect that video display can be conducted with a high contrast and modulation because low frequency components in light emission luminance distribution of each light source are sufficiently strong.

In other words, the liquid crystal display apparatus according to the present embodiment brings about the effect that luminance unevenness is hard to be perceived because high frequency components in light emission luminance distribution of each light source are weak and video display can be conducted with a high contrast and modulation because low frequency components in light emission luminance distribution of each light source are sufficiently strong.

Features in the case where in the present embodiment the first threshold is a minimum contrast which can be perceived by human being, the first spatial frequency is 0.4/(distance between light sources) and the second threshold is a minimum contrast which can be perceived by human being will now be described.

The minimum contrast which can be perceived by human being is called contrast threshold. The contrast threshold can be found experimentally as a minimum contrast ($A/L_0$) which can be perceived by a subject when the stimulus amplitude is changed as already described in the first embodiment. It is generally known that the contrast threshold thus found differs depending upon the spatial frequency of stimulus. The first threshold in the present embodiment may be a minimum value of the contrast threshold at a spatial frequency of at least 1/(distance between light sources), or may be a minimum value of the contrast threshold over the whole spatial frequency. The second threshold may be a minimum value of the contrast threshold at a spatial frequency of 0.4/(distance between light sources) or less, or may be a minimum value of the contrast threshold over the whole spatial frequency. Since generally well known minimum value of the contrast threshold is approximately −53 dB, the first threshold may be set equal to −53 dB. In the same way, the second threshold may be set equal to −53 dB.

The light source in this case can be implemented in the same way as the description in the first embodiment. As described in the effect in the first embodiment, the liquid crystal display apparatus according to the present embodiment brings about the effect that luminance unevenness is hard to be perceived because high frequency components in light emission luminance distribution of each light source are weak. As described in the effect in the second embodiment, the liquid crystal display apparatus according to the present embodiment brings about the effect that video display can be conducted with a high contrast and modulation because low frequency components in light emission luminance distribution of each light source are sufficiently strong. In other words, the liquid crystal display apparatus according to the present embodiment brings about the effect that luminance unevenness is hard to be perceived because high frequency components in light emission luminance distribution of each light source are weak and video display can be conducted with a high contrast and modulation because low frequency components in light emission luminance distribution of each light source are sufficiently strong.

Fourth Embodiment

A liquid crystal display apparatus according to a fourth embodiment of the present invention will now be described.

The liquid crystal display apparatus according to the present embodiment is the same in basic configuration as that according to the first embodiment. However, the liquid crystal display apparatus according to the present embodiment has a feature that a section of light emission luminance distribution of a certain single light source takes a shape of a window function.

It is desirable that the section of light emission luminance distribution of a certain single light source takes a shape of a window function which makes the amplitude of spatial frequency components small at spatial frequencies of at least 1/(distance between light sources) and makes the amplitude of spatial frequency components large in a spatial frequency range from 0 [×1/distance between light sources] to 0.5 (distance between light sources).

As for the section shape of light emission luminance distribution of a single light source according to the present embodiment, for example, a shape of the minimum 4 term Blackman-Harris window function defined by Nuttall, the minimum 4 term Blackman-Harris window function, the Blackman window function, the Gauss window function, the Hamming window function, the Hanning window function, the modified Barlett-Hann window function, or the like is suitable. Especially, the minimum 4 term Blackman-Harris window function defined by Nuttall is suitable for the section shape of light emission luminance distribution of a single light source according to the present embodiment, because amplitude of spatial frequency components at spatial frequencies of at least 1/(distance between light sources) is small and amplitude of spatial frequency components in the spatial frequency range from 0 [×1/distance between light sources] to 0.5 (distance between light sources) can be made large.

The following equation represents a section shape of light emission luminance distribution of a single light source taking the shape of the minimum 4 term Blackman-Harris window function defined by Nuttall. In the following equation, L is relative luminance of the light source as compared with the light emission luminance at the center of the light source, and x is a location obtained by taking the center of the light source as an origin and normalized by the distance between light sources. The unit of x is [×distance between light sources].

$$L=0.3635819+0.4891775\times\cos(0.5\pi x)+0.1365995\times\cos(\pi x)+0.0106411\times\cos(1.5\pi x)$$

The section shape of light emission luminance distribution of a single light source in the present embodiment is characterized by amplitude of its spatial frequency components. In general, however, it is difficult to determine the corresponding section shape of light emission luminance distribution of a single light source immediately from the feature of the spatial frequency components. This is because the light emission luminance distribution of the light source cannot assume a negative value. However, window functions having features similar to features required of the section shape of light emission luminance distribution of a single light source have been studied from old. They are suitable as the section shape of light emission luminance distribution of a single light source as well. Therefore, light emission luminance distribution having a shape of a window function is suitable as light emission luminance distribution of the light source in the liquid crystal display apparatus according to the present embodiment as well.

Light Emission Luminance Distribution of Light Source in Present Embodiment

Figure 24:
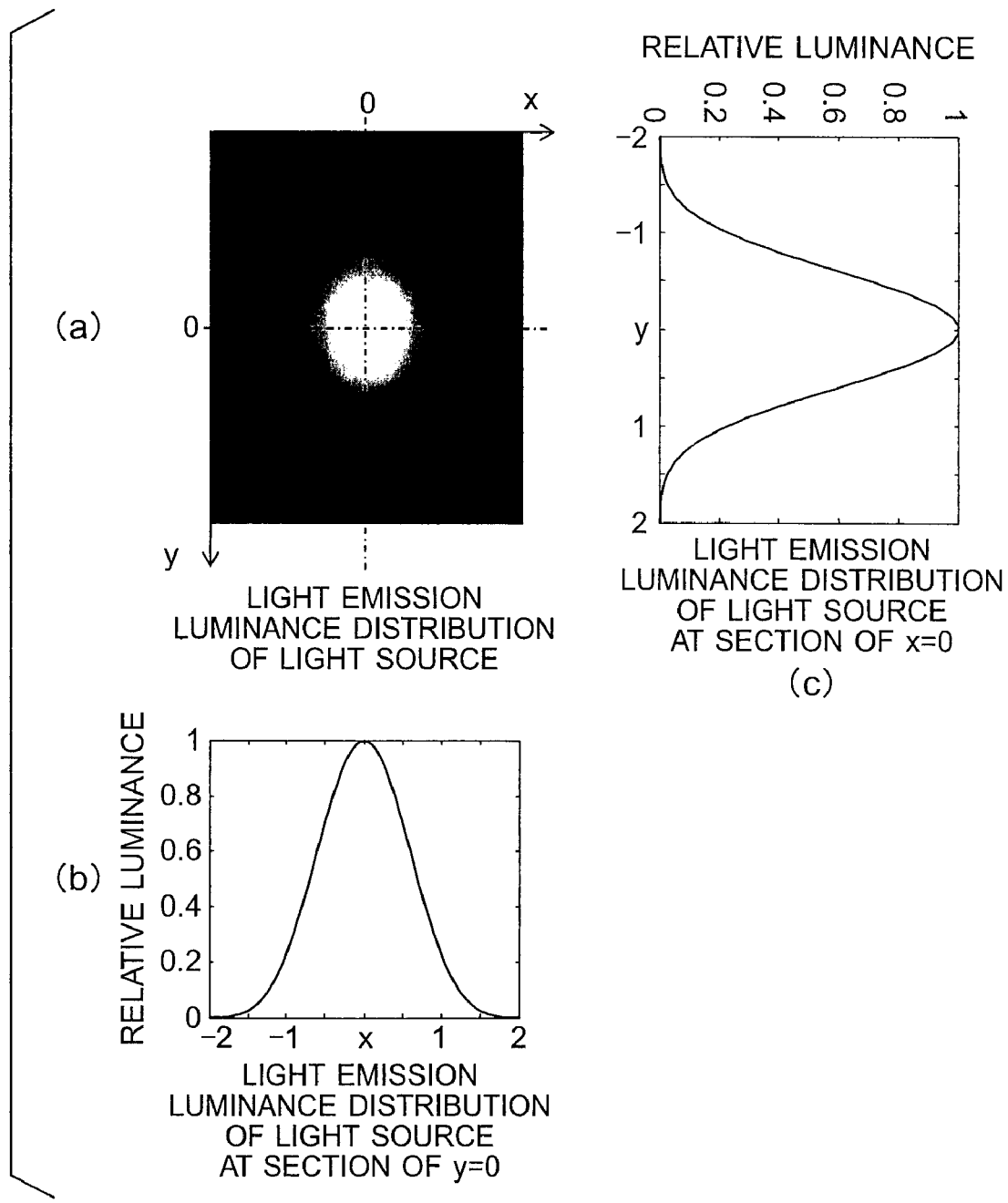
FIGS. 24(a) to 24(c) are diagrams showing an example of light emission luminance distribution of a light source in a liquid crystal display apparatus according to a fourth embodiment.

FIGS. 24(a), 24(b) and 24(c) show an example of light emission luminance distribution of a certain single light source in a liquid crystal display apparatus according to the present embodiment. FIG. 24(a) is a photograph showing an example of light emission luminance distribution of a certain single light source obtained when seen from a direction perpendicular to the liquid crystal panel. FIGS. 24(b) and 24(c) are diagrams showing light emission luminance distribution of a certain single light source shown in FIG. 24(a) obtained at sections of the vertical location=0 and horizontal location=0. The magnitude of the light emission luminance of the light source is indicated by a relative luminance value normalized by a maximum value (a value at the vertical location=0 or the horizontal location=0 in FIG. 24(b) or 24(c)) of the light emission luminance of the light source.

FIGS. 24(a), 24(b) and 24(c) show section shapes of light emission luminance distribution of a single light source taking a shape of the minimum 4 term Blackman-Harris window function defined by Nuttall, as an example. As described above, however, the section shape of light emission luminance distribution of a single light source according to the present embodiment is not restricted to this shape. The light source in the present embodiment can be implemented in the same way as the description of the first embodiment.

An effect brought about by the present embodiment will now be described.

Figure 25B:
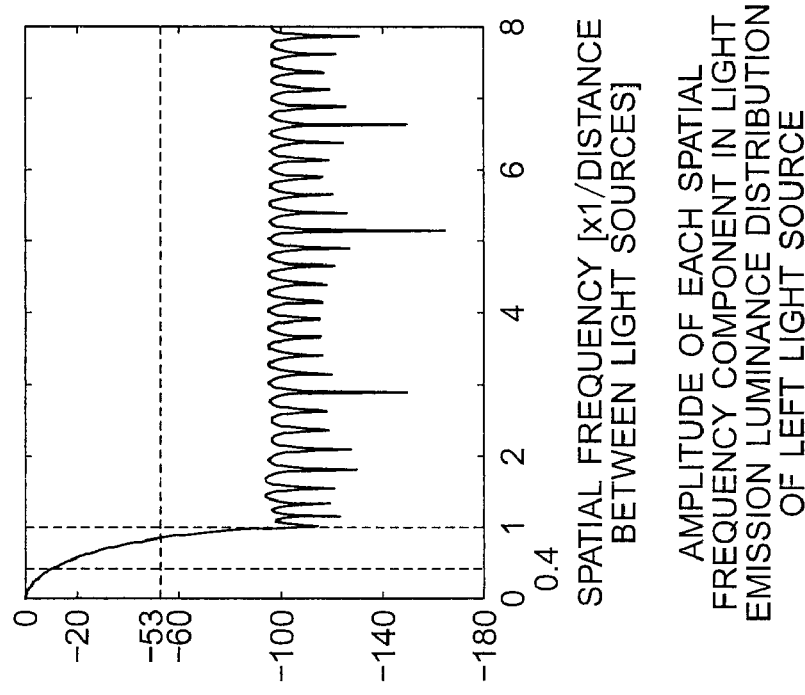
FIGS. 25A and 25B are diagrams showing light emission luminance distribution of a light source and its components in a liquid crystal display apparatus according to the fourth embodiment.
Figure 25A:
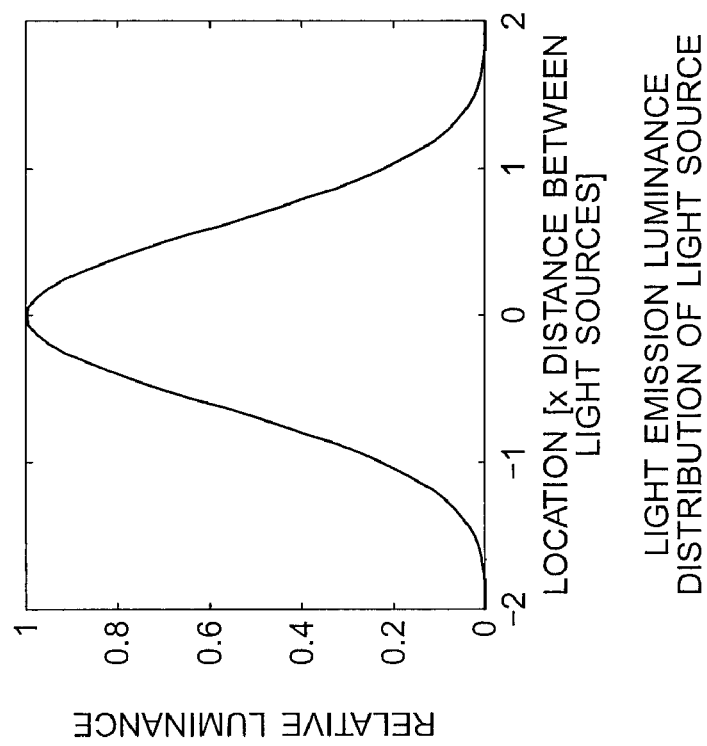

FIGS. 25A and 25B show an example of light emission luminance distribution of a certain single light source and its components in the liquid crystal display apparatus according to the present embodiment. In FIGS. 25A and 25B, "distance between light sources" means the shortest distance between a light source center in question and adjacent light source centers. As for the amplitude of spatial frequency components in light emission luminance distribution of a certain single light source in the present embodiment, amplitude of components at spatial frequencies of at least 1/(distance between light sources) is sufficiently small and amplitude of components in the frequency range from the spatial frequency of the direct current component to 0.4/(distance between light sources) is sufficiently large, as appreciated from FIG. 25B.

As described in the effect in the first embodiment, the liquid crystal display apparatus according to the present embodiment brings about the effect that luminance unevenness is hard to be perceived because high frequency components in light emission luminance distribution of each light source are weak. As described in the effect in the second embodiment, the liquid crystal display apparatus according to the present embodiment brings about the effect that video display can be conducted with a high contrast and modulation because low frequency components in light emission luminance distribution of each light source are sufficiently strong. In other words, the liquid crystal display apparatus according to the present embodiment brings about the effect that luminance unevenness is hard to be perceived because high frequency components in light emission luminance distribution of each light source are weak and video display can be conducted with a high contrast and modulation because low frequency components in light emission luminance distribution of each light source are sufficiently strong.

According to the present embodiment, luminance unevenness can be suppressed and the contrast improving effect can be prevented from being weakened as far as possible as heretofore described.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A liquid crystal display apparatus comprising:
a liquid crystal panel having a plurality of pixels arranged in a matrix form;
a back light having a plurality of light sources which can be controlled individually in light emission luminance to supply light to the liquid crystal panel;
an image processing unit configured to calculate luminance setting values respectively of the light sources of the back light on the basis of a video signal and correct the video signal on the basis of the luminance setting value of each light source;
a back light control unit configured to control the back light on the basis of luminance setting values; and
a liquid crystal drive unit configured to drive the liquid crystal panel on the basis of the corrected video signal,
wherein in strength distribution of light incident on the liquid crystal panel from each of the light sources, a relative strength compared with a direct component in spatial frequency domain is equal to or less than a first threshold in a spatial frequency region having a value of at least 1.

2. The apparatus according to claim 1, wherein the first threshold is −53 dB.

3. A liquid crystal display apparatus comprising:
a liquid crystal panel having a plurality of pixels arranged in a matrix form;
a back light having a plurality of light sources which can be controlled individually in light emission luminance to supply light to the liquid crystal panel;
an image processing unit configured to calculate luminance setting values respectively of the light sources of the back light on the basis of a video signal and correct the video signal on the basis of the luminance setting value of each light source;
a back light control unit configured to control the back light on the basis of luminance setting values; and
a liquid crystal drive unit configured to drive the liquid crystal panel on the basis of the corrected video signal,
wherein in strength distribution of light incident on the liquid crystal panel from each of the light sources, a relative strength compared with a direct component in a spatial frequency domain is equal to or greater than a second threshold in a spatial frequency region having a spatial frequency equal to or less than a first spatial frequency which is greater than 0 and less than 1 in value.

4. The apparatus according to claim 3, wherein
the first spatial frequency is 0.4/(distance between light sources), and
the second threshold is −53 dB.

5. A liquid crystal display apparatus comprising:
a liquid crystal panel having a plurality of pixels arranged in a matrix form;
a back light having a plurality of light sources which can be controlled individually in light emission luminance to supply light to the liquid crystal panel;
an image processing unit configured to calculate luminance setting values respectively of the light sources of the back light on the basis of a video signal and correct the video signal on the basis of the luminance setting value of each light source;
a back light control unit configured to control the back light on the basis of luminance setting values; and
a liquid crystal drive unit configured to drive the liquid crystal panel on the basis of the corrected video signal,
wherein in strength distribution of light incident on the liquid crystal panel from each of the light sources, a relative strength compared with a direct component in spatial frequency domain is equal to or less than a first threshold in a spatial frequency region having a value of at least 1, and is equal to or greater than a second threshold in a spatial frequency region having a spatial frequency equal to or less than a first spatial frequency which is greater than 0 and less than 1 in value.

6. The apparatus according to claim 5, wherein the first threshold is −53 dB.

7. The apparatus according to claim 5, wherein
the first spatial frequency is 0.4/(distance between light sources), and
the second threshold is −53 dB.

* * * * *